United States Patent
DeZeeuw et al.

(10) Patent No.: US 8,287,195 B2
(45) Date of Patent: Oct. 16, 2012

(54) MOTOR CONTROLLED MACRO RAIL FOR CLOSE-UP FOCUS-STACKING PHOTOGRAPHY

(76) Inventors: Paul DeZeeuw, Rapid River, MI (US); Linden Gledhill, Downingtown, PA (US); Matthew William Cardwell, Rock, MI (US)

(*) Notice: Subject to any disclaimer, the term of this patent is extended or adjusted under 35 U.S.C. 154(b) by 0 days.

(21) Appl. No.: 12/927,166

(22) Filed: Nov. 9, 2010

(65) Prior Publication Data
US 2011/0123188 A1    May 26, 2011

Related U.S. Application Data

(60) Provisional application No. 61/280,923, filed on Nov. 10, 2009.

(51) Int. Cl.
*G03B 17/00* (2006.01)
*H04N 5/225* (2006.01)

(52) U.S. Cl. .................................. 396/428; 348/373
(58) Field of Classification Search .................. 396/428; 348/373
See application file for complete search history.

(56) References Cited

U.S. PATENT DOCUMENTS

| | | | |
|---|---|---|---|
| 2,842,026 A | 7/1958 | Reese | |
| 3,437,753 A | 4/1969 | Stith | |
| 3,598,355 A * | 8/1971 | English | 396/428 |
| 4,498,744 A * | 2/1985 | Ealovega et al. | 352/89 |
| 4,699,484 A * | 10/1987 | Howell et al. | 352/243 |
| 4,792,822 A | 12/1988 | Akiyama et al. | |
| 4,870,436 A * | 9/1989 | Tanaka | 396/83 |
| 4,897,678 A | 1/1990 | Leberl | |
| 4,943,821 A * | 7/1990 | Gelphman et al. | 396/24 |
| 5,077,569 A * | 12/1991 | Notagashira et al. | 396/71 |
| 5,204,739 A | 4/1993 | Domenicali | |
| 5,221,941 A * | 6/1993 | Matsui et al. | 396/157 |
| 5,463,432 A | 10/1995 | Kahn | |
| 5,583,602 A | 12/1996 | Yamamoto | |
| 5,752,113 A | 5/1998 | Borden | |
| 5,768,647 A | 6/1998 | Coffin et al. | |
| 5,802,412 A | 9/1998 | Kahn | |
| 5,850,579 A | 12/1998 | Melby et al. | |
| 7,036,777 B2 | 5/2006 | Diana et al. | |
| 7,077,582 B2 | 7/2006 | Johnson | |

(Continued)

OTHER PUBLICATIONS

The DIY Macro Rail, DIYPhotography.net, www.diphotography.net/the-diy-macro-rail, Jan. 21, 2008.*

*Primary Examiner* — Rodney Fuller
(74) *Attorney, Agent, or Firm* — Eugene R. Quinn, Jr., Esq.; G. Philip J. Zies, Esq.; Zies Widerman & Malek

(57) ABSTRACT

A motor controlled rail assembly is provided which simplifies and automates the process of taking focus-stacked pictures. This device can be used to incrementally move a camera or other photographic device a programmable distance forward or backward in precise steps relative to an external object to facilitate focus-stacked photography. The device may include a motor-driven macro rail assembly, a controller assembly and a camera, which, generally speaking, are configured as follows: a camera is attached to a macro rail carriage which is driven by the motor and controller. The device may have different modes of operation (an automatic step mode, an automatic distance mode, a total distance mode, a distance per step mode, a continuous mode and a manual mode) to yield improved results in different situations.

38 Claims, 27 Drawing Sheets

U.S. PATENT DOCUMENTS

| | | |
|---|---|---|
| 7,394,977 B2 * | 7/2008 | Park et al. .................. 396/5 |
| 2002/0150398 A1 | 10/2002 | Choi et al. |
| 2003/0077082 A1 | 4/2003 | Ito |
| 2005/0286800 A1 * | 12/2005 | Gouch .................. 382/284 |
| 2006/0045388 A1 | 3/2006 | Zeineh et al. |
| 2006/0109565 A1 | 5/2006 | Watanabe et al. |
| 2008/0018779 A1 * | 1/2008 | Gomi et al. ............... 348/369 |
| 2009/0041450 A1 | 2/2009 | Fritts |
| 2009/0073388 A1 | 3/2009 | Dumm |
| 2009/0085957 A1 * | 4/2009 | Fujimori .................. 347/20 |
| 2009/0147072 A1 * | 6/2009 | Brotherton-Ratcliffe et al. .................. 348/40 |
| 2009/0179127 A1 | 7/2009 | Pettey |
| 2009/0185758 A1 * | 7/2009 | Gouch .................. 382/284 |

* cited by examiner

MOTOR CONTROLLED MACRO RAIL FOR CLOSE-UP FOCUS-STACKING PHOTOGRAPHY

RELATED APPLICATIONS

This application claims the benefit of U.S. Provisional Patent Application Ser. No. 61/280,923 titled Automatic Motor Controlled Macro rail for Close-Up Focus-Stacking Photography filed on Nov. 10, 2009 by the inventors of the present application, the contents of which are incorporated herein by reference.

FIELD OF THE INVENTION

The present invention relates generally to close-up and macro photography and in particular to a motor controlled macro rail for performing close-up focus-stacking photography.

BACKGROUND OF THE INVENTION

Currently there are a number of solutions for performing close-up focus stacking photography. Existing solutions involve the use of a conventional macro rail that assists a user with taking focus-stacked photographs manually. These solutions fail to meet the needs of the industry because they suffer drawbacks related to lack of accuracy, reproducibility, speed and precision. In addition, manual focusing rails cannot be used at sub-millimeter step increments. Manually adjusting the rail can also cause inadvertent movement of a camera during photograph collection. Such movement causes parallax error and misalignment of images which focus stacking software may not be able to correct. While there exists software to stack photographs that can handle some displacement, such software cannot compensate for movement of the rail that occurs while the photograph is captured which causes the photographs to be blurry and ultimately result in a bad stack and unusable or compromised quality.

Additionally, speed in collecting images for focus stacking is important when capturing subjects (e.g. an insect or flower) in the natural world since such subjects do not typically remain still. In the manual method the macro rail and camera each need to be controlled independently thus causing undesirable time delay between photographs. Existing systems also suffer drawbacks related to precisely controlling the distance of movement of the camera between each photograph.

It would be desirable to have a device that simplifies the process of collecting images for focus-stacking photography. It would also be desirable to have a device that allows images for focus-stacked photography to be collected with greater speed, accuracy and precision than existing systems in order to produce a focus-stacked photograph with an improved depth of field. Improvements to devices and methods for performing close-up focus-stacking photography are thus desired.

SUMMARY OF THE INVENTION

The present invention advantageously fills the aforementioned deficiencies by providing a motor-controlled macro rail for close-up focus-stacking photography which simplifies and improves the process of taking focus-stacked pictures.

Embodiments of the present invention include a motor-controlled macro rail, which is made up of the following components: a rail minimally capable of moving forward and back with respect to an object (i.e., the subject of interest), a precision controlled motor, and a controller capable of providing instruction to the motor to move the rail back and forth in precise steps or with fluid (continuous) motion. These components may be connected as follows: the motor is attached to the macro rail in such a way that it moves the rail toward or away from the subject of interest. The controller is attached, via a cable, to the motor and the camera is attached to the macro rail.

Embodiments of the present invention may also include a motor-controlled macro rail having one or more of the following: configurable torque, speed, acceleration, number of pictures per step, duration of picture exposure, time between pictures to settle the camera, backlash compensation, and automatic return of the camera to its original position. Physically, the camera position may also be adjusted laterally. In the embodiment where there is lateral adjustment another rail is mounted on another axis. For focus-stacking, this additional rail can be used to adjust the camera left to right, for example, and may manually or automatically controlled. This multi-axis rail assembly may be particularly useful to enable stacked close-up/macro panoramas.

Embodiments of the present invention are unique when compared with other known devices and solutions because they provide: (1) automated photo capture; (2) positional accuracy and precision; (3) speed of photo stacking image collection; (4) sub-millimeter increment steps; and (5) return to start position for an exact repeat sequence of image capturing enabling panorama images after lateral displacement at 90 degrees to the automated focus rail. Similarly, the associated method is unique in that it: (1) couples a motor and controller to a macro rail; (2) provides multiple modes of operation; and (3) is completely configurable.

Embodiments of the present invention are unique when compared with other known devices and solutions in that it is structurally different from other known devices or solutions. More specifically, embodiments of the present invention are unique due to the presence of a precision motor attached to a macro rail as well as integrated control of an external camera and/or flash. Furthermore, the processes associated with the aforementioned embodiments are likewise unique and different from known processes and solutions. More specifically, the device owes its uniqueness to the fact that it: (1) provides automated operation unlike manual solutions available now, and (2) has different modes (preferably 5 or more) in which to capture the photographs for improved focus-stacking.

Among other things, it is an objective of the present invention to provide an automatic motor-controlled macro rail for close-up focus-stacking photography that does not suffer from any of the problems or deficiencies associated with prior solutions.

The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION

The present invention is directed to a motor-controlled macro rail for close-up focus-stacking photography. Reference will now be made in detail to the present exemplary embodiments of the invention, examples of which are illustrated in the accompanying drawings.

Figure 1:
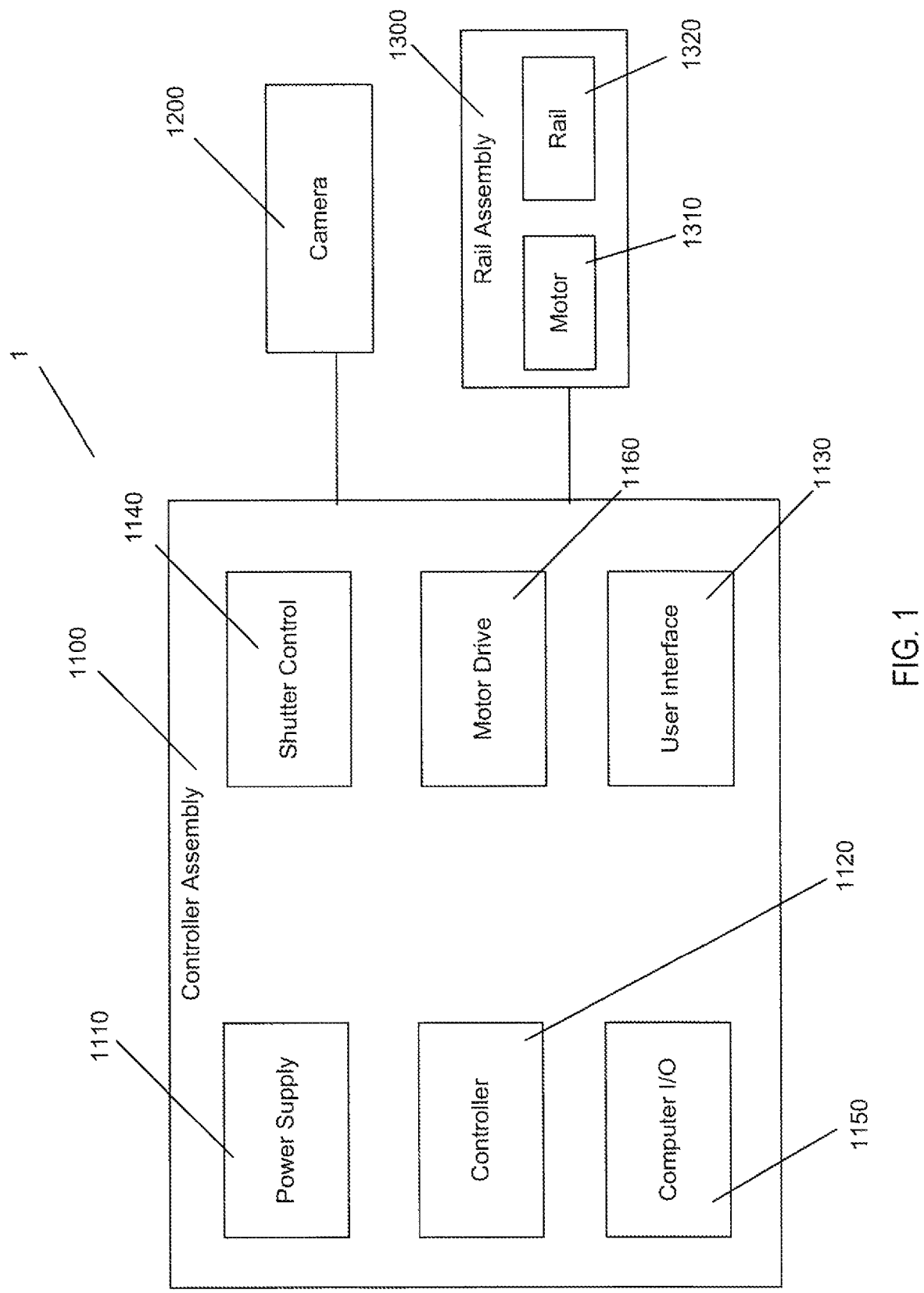
FIG. 1 is a block diagram of a macro photography system in accordance with an exemplary embodiment of the invention.

Referring now to FIG. 1, a block diagram of a macro photography system 1 is shown in accordance with an exemplary embodiment of the invention. As shown, the macro photography system 1 includes a controller assembly 1100, a camera 1200 and a macro rail assembly 1300. The macro rail assembly 1300 includes a motor 1310 and a macro rail 1230. The controller assembly 1100 may include a power supply module 1110, a controller module 1120, a user interface module 1130, a shutter control module 1140, a computer I/O module 1150, and a motor drive module 1160. The power supply module 1110 may include electrical components responsible for conditioning an input voltage and regulating it to a voltage that is suitable for the other components in the device. A reverse-battery protection feature may also be included for mitigating risk of damage to the controller assembly should the wrong polarity voltage be applied. The controller module 1120 is responsible for coordinating inputs (e.g. buttons, triggers) and outputs (e.g. LCD, LED, motor control) to and from the user interface 1130, the camera 1200 and the macro rail assembly 1300. By way of example, the controller module 1120 may be a microprocessor programmed to perform the functions of coordinating such inputs and outputs. The user interface 1130 may include interface components for allowing a user to interact with the device. The interface components may include an LCD display device 1131 (shown in FIG. 10), a switchboard assembly 1132 (shown in FIG. 10 and FIG. 11D) and interface connection components such as an LCD interface connector 1134 (shown in FIG. 11C). The shutter control module 1140 is communicatively coupled to the microprocessor 1120 and the camera 1200 and is configured to activate a camera shutter or flash. The computer I/O module 1150 is configured to support communication between the controller assembly 1100 and an external computer (not shown) to support transmission of data (e.g. image data) for external processing. The motor drive module 1160 is communicatively coupled to the microprocessor 1120 and the motor 1310 and is configured to transmit instructions to the motor suitable for controlling operating parameters (e.g. speed, torque, direction) of the motor. An interface cable may be used to connect the controller assembly 1100 to the motor 1310. Interface cables or a wireless method such as infrared may be used to connect the controller assembly 1100 to the camera 1200.

Figure 2A:
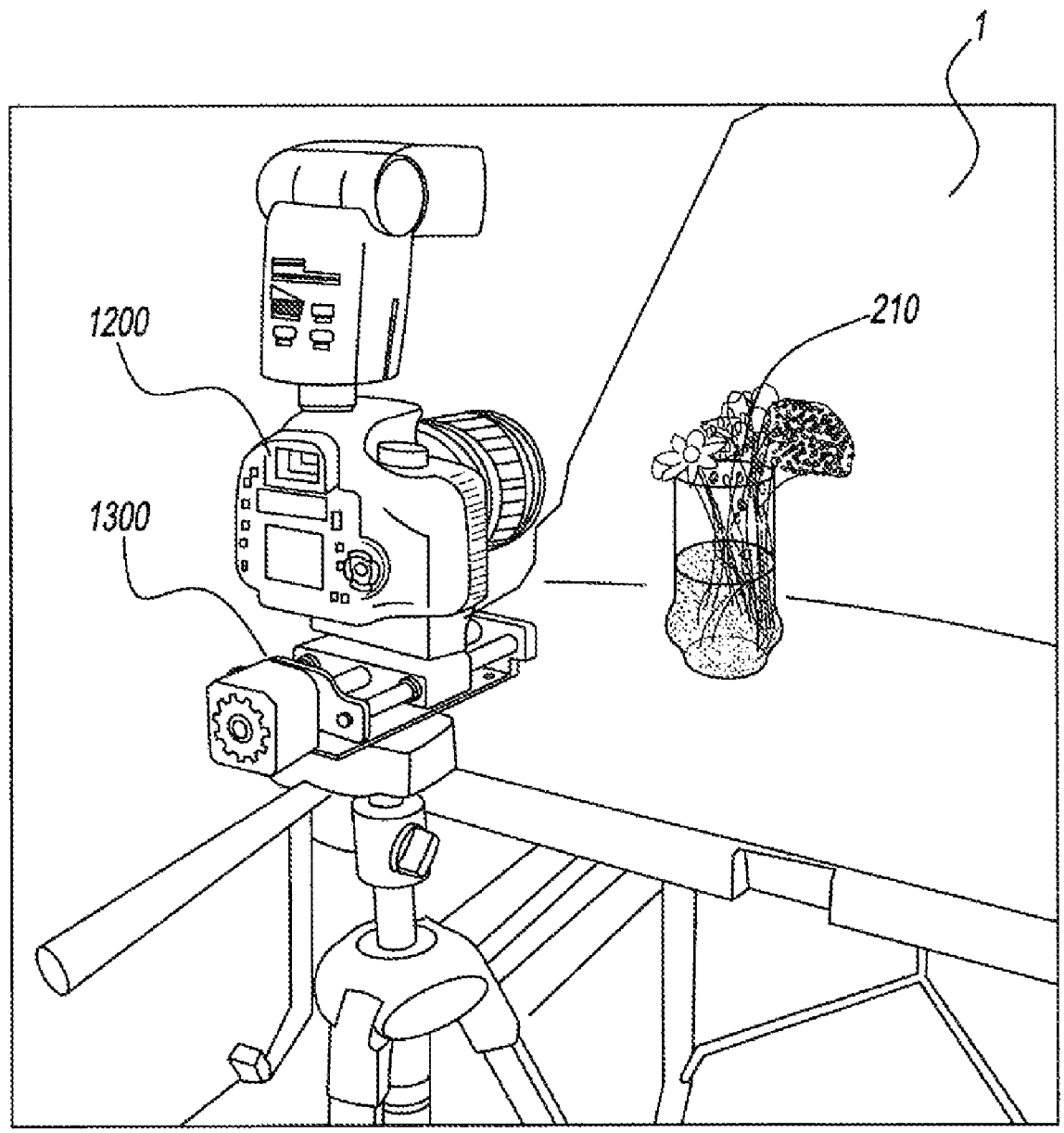
FIG. 2A is a perspective view of the macro photography system of FIG. 1.

Referring now to FIG. 2A, a perspective view of the macro photography system 1 of FIG. 1 is shown. The macro photography system 1 includes the controller assembly (shown in FIG. 10), camera 1200 and macro rail assembly 1300. A user may first configure the operating parameters of the motor 1310 and initiate a photo capture sequence of an object of interest 210 by interacting with the user interface 1130. The operating parameters may be selected based on environmental conditions and characteristics of the object of interest 210.

Figure 2B:
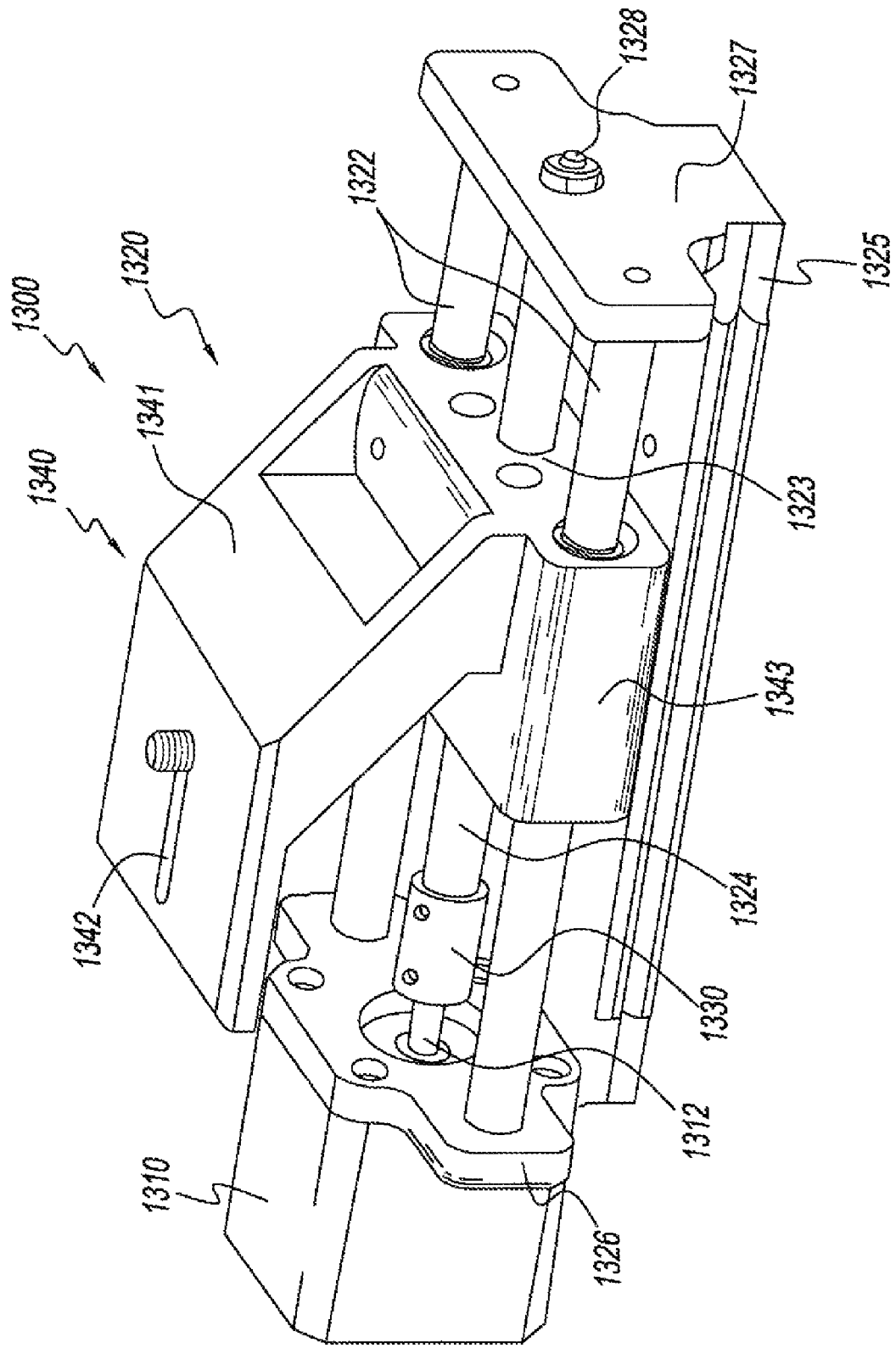
FIG. 2B is a detailed perspective view of the macro rail assembly of FIG. 2A.
Figure 2C:
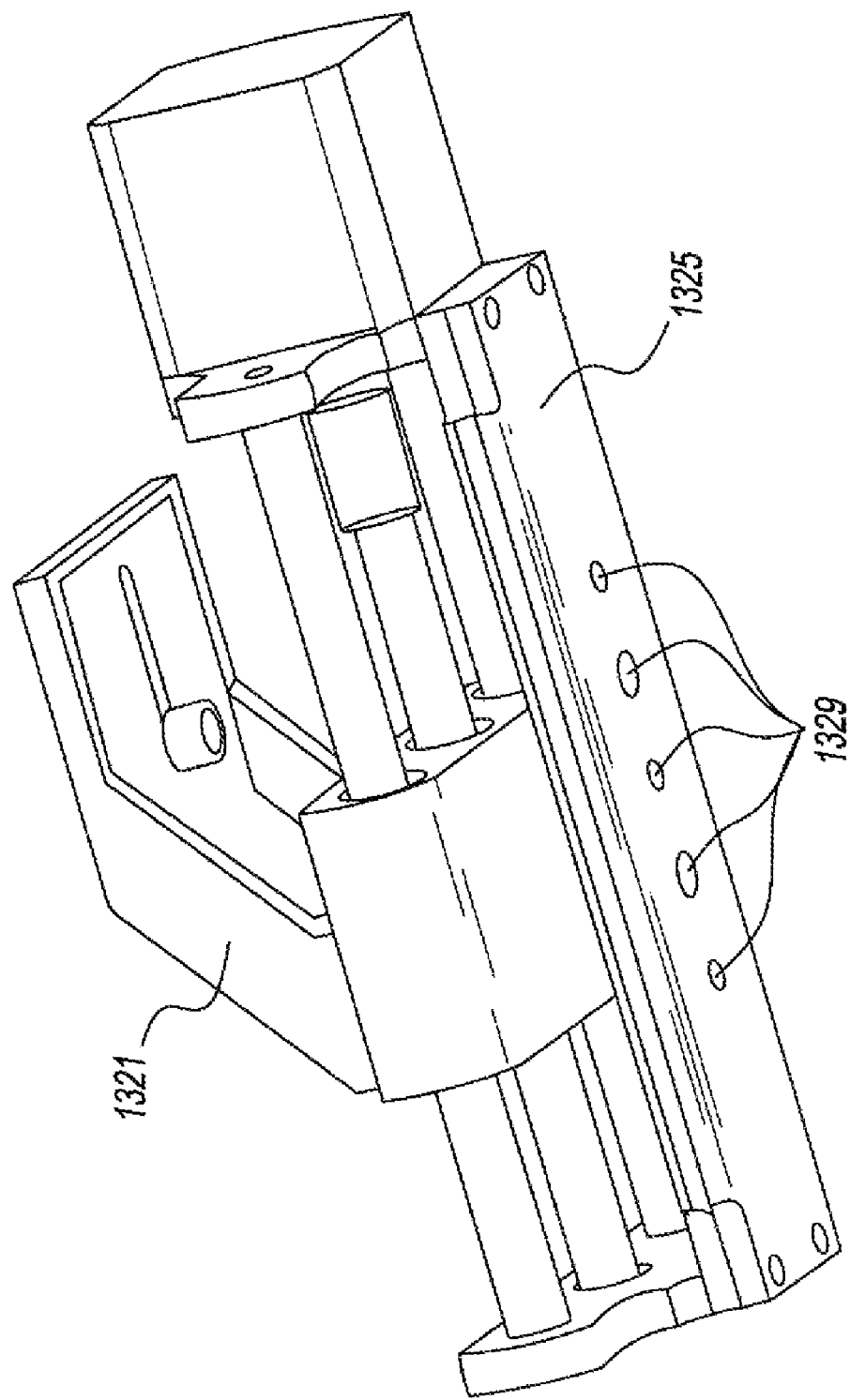
FIG. 2C is another detailed perspective view of the macro rail assembly of FIG. 2A.
Figure 2D:
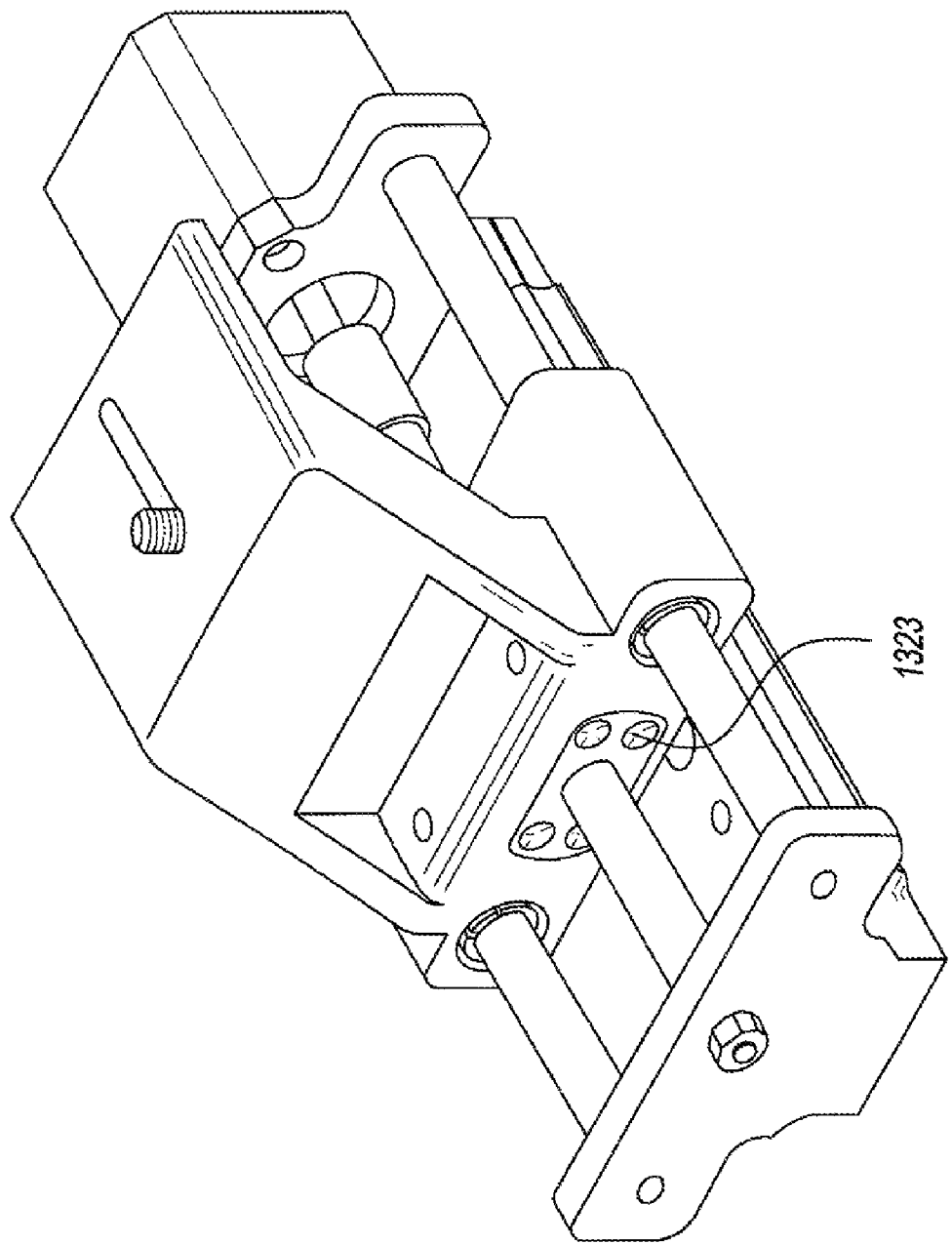
FIG. 2D is another detailed perspective view of the macro rail assembly of FIG. 2A.

Referring now to FIG. 2B, FIG. 2C and FIG. 2D, detailed perspective views of the macro rail assembly 1300 of FIG. 2A are shown. As shown, the macro rail assembly 1300 includes motor 1310 and macro rail 1320. The macro rail 1320 includes a carriage 1340, two guide rods 1322, a drive nut 1323, and a base section 1325. The guide rods 1322 may each be approximately 6 inches (approximately 152.4 millimeters) in length with an outer diameter of approximately 0.375 inches (approximately 9.52 millimeters) and be comprised of 303 stainless steel (e.g. a guide rod such as that supplied by McMaster Carr having a part no. of 88915K213). The guide rods 1322 may also be precision around and polished. The base section 1325 may be approximately 6 inches (approximately 152.4 millimeters) in length and may be comprised of 6061 aluminum. The base section 1325 may also include a forward plate 1327 and a rear plate 1326. The forward plate 1327 and rear plate 1326 may each also be comprised of 6061 aluminum. The rear plate 1326 includes a hole pattern configured for mounting the rear plate 1326 to the motor 1310. By way of example the motor 1310 may be a stepper motor such as a NEMA17 1.8 degree per full step motor (model STP-MTR-17040) suitable for providing 61.4 oz-in of torque. The depth of the motor may be 1.58 inches (40.13 mm). The motor may provide 200 full steps per revolution. The controller 1100 may also employ micro-stepping at 16 micro-steps per full step, thereby providing 3200 motor steps per revolution. When using a threaded rod having a thread spacing of 16 threads per inch a resolution of 51200 steps per inch or 0.00001953125 inches per step (approximately 0.0004961 mm/step) is thus realized. Such precision greatly exceeds that of known rails which provide marked indexes at a spacing of one or more millimeters. The macro rail assembly 1300 further comprises a motor coupler 1330 for coupling the threaded rod 1324 to a motor shaft 1312. The motor coupler 1330 may be comprised of 6061 aluminum. The macro rail assembly 1300 also has a nut 1328 for attaching the threaded rod 1324 to the forward plate 1327. The nut 1328 may be comprised of a thermoplastic material such as polyoxymethylene (e.g. Delrin). By way of example, the threaded rod 1324 may be comprised of stainless steel and may have a thread spacing of 16 threads per inch (approximately 16 threads per 25.4 mm) suitable for providing 0.0625 inches (approximately 1.5875 mm) of movement per rotation (e.g. a rod such as that supplied by McMaster Carr having a part no. of 9898A350). The threaded rod 1324 and drive nut 1323 may be removably attached to the macro rail assembly 1300 to allow another threaded rod and drive nut having a different thread spacing to be used with the macro rail assembly 1300. The precision of movement of the carriage 1340 along the guide rods 1322 may be modified by changing out the threaded rod 1324 and drive nut 1323, thus changing the resolution of the macro rail assembly 1300. It is noted that other methods may also be used to couple the motor 1310 to the macro rail, such as, but not limited to: rack and pinion or acme threaded rods, worm gears or miter gears. As shown in FIG. 2C, the carriage 1340 may have a top section 1341 having a slot shaped cutout 1342 suitable for allowing the camera 1200 to be removably and adjustably mounted thereto. The carriage 1340 may also include a bottom section 1343 having holes sized to slidably engage the guide rods 1322. The bottom section 1343 of the carriage 1340 may also be configured to be removably coupled to the drive nut 1323. The bottom section 1343 and top section 1341 of the carriage 1340 may be removably attached to one another by way of fasteners such as screws or may be formed as a single component. Each section of the carriage 1340 may be comprised of 6061 aluminum. As shown in FIG. 2D, the base section 1325 also includes a hole pattern suitable for removably mounting the macro rail assembly 1320 to an external support structure such as a tri-pod. In certain embodiments a plastic bearing is utilized in the carriage so there is no direct contact between the stainless rod and the carriage itself.

Figure 3:
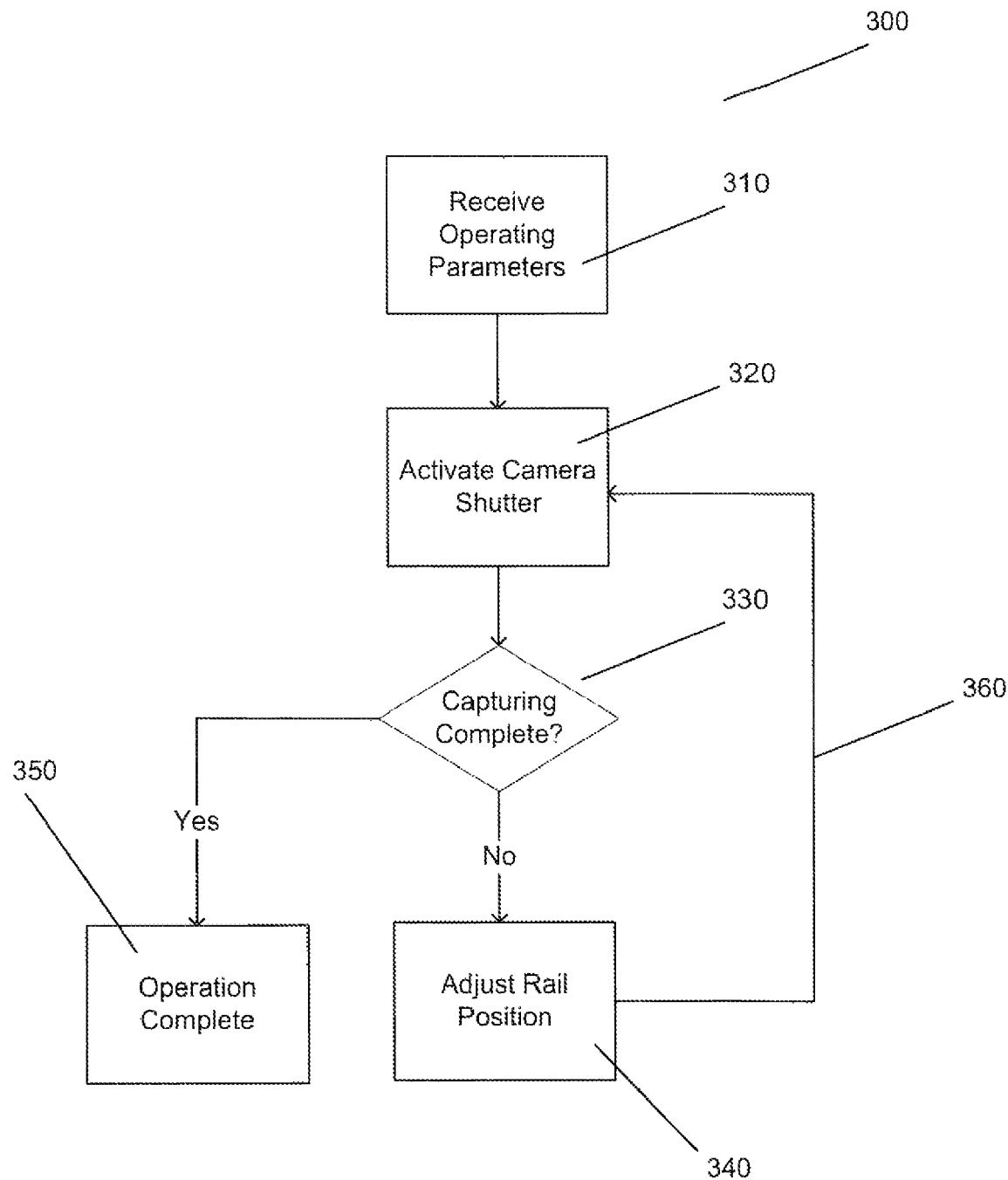
FIG. 3 is a flow diagram illustrating a process of capturing photographs that may be carried out with the macro photography system of FIG. 1.

Referring now to FIG. 3, a flow diagram is shown illustrating a process 300 of capturing photographs that may be carried out with the macro photography system 1 of FIG. 1. A macro photography system 1 is first provided having a camera 1200, a macro rail assembly 1300 and a controller assembly 1100 communicatively coupled to the camera 1200 and macro rail assembly 1300 and programmed with one or more modes of operation for capturing images. At a first step, 310, the controller assembly 1100 receives operating parameters from a user operating the user interface 1130. The operating parameters are selected based on the desired mode of operation. The mode of operation may be selected from one of: an automatic step mode, an automatic distance mode, a total distance mode, a distance per step mode, a continuous mode and a manual mode. When selecting the automatic step mode the user is prompted to enter operating parameters including a beginning position and an ending position of the carriage 1340 as well as a desired total number of pictures. By way of example, the user may input the beginning position and ending position by using a Forward (FWD) button and a Backward (BACK) button (see FIG. 10) provided by the switchboard assembly 1132 of the user interface module 1130. When selecting the automatic distance mode the user is prompted to enter operating parameters including a beginning position and an ending position of the carriage 1340 as well as a distance per step/interval value. When selecting the total distance mode, the user is prompted to enter operating parameters including a total distance the carriage 1340 will travel as well as the number of steps or intervals to use in that given distance. When selecting the distance per step mode, the user is prompted to enter operating parameters including the distance to travel per step and the number of steps desired. When selecting the continuous operating mode, the user is prompted to enter operating parameters including the total distance the carriage 1121 travels. When selecting the manual mode, the user is prompted to enter operating parameters including the distance to travel per step or interval. At a next step 320 the controller module 1120 begins the process of capturing photos by activating the camera shutter and/or flash. To activate the camera shutter and/or flash, the controller module 1120 sends a signal to the shutter control module 1140 which in turn communicates with the camera 1200. The shutter control module 1140 is communicatively coupled with the camera 1200 (e.g. by an interface cable or IR). At a next step 330, the controller module 1120 determines, based on the selected mode of operation, if the photo capturing process has been completed. When the process has not yet completed, the controller module 1120, at step 340, instructs the motor drive module 1160 to drive the motor 1310 to move the carriage 1340 to the next position in accordance with the selected mode of operation. Unless the user has selected the continuous operating mode the next position is determined by adding the entered or calculated distance per step value to the current position of the carriage 1340. When the process has completed, the controller module 1120, at step 350, completes the photo capturing operation. The controller module 1120 may store or transmit the captured photos to an external computing device by way of the computer I/O module 1150. The external computing device may perform post processing steps on the set of photographs to create a single stacked image. Alternatively, a computer controlled software version may be employed whereby the controller is connected to a computer directly or indirectly. The user may use the computer to control the macro rail 1300 and used in combination with a camera connected directly or indirectly to the computer which downloads the images directly for processing. The controller module 1120 may also instruct the motor drive module 1160 to drive the motor to return the carriage 1340 to a starting position. The controller module 1120 may also support transferring the image directly to a remote device, such as a personal computer, smartphone or storage device or server. The contemplated modes of operation will now be discussed in greater detail.

Figure 4A:
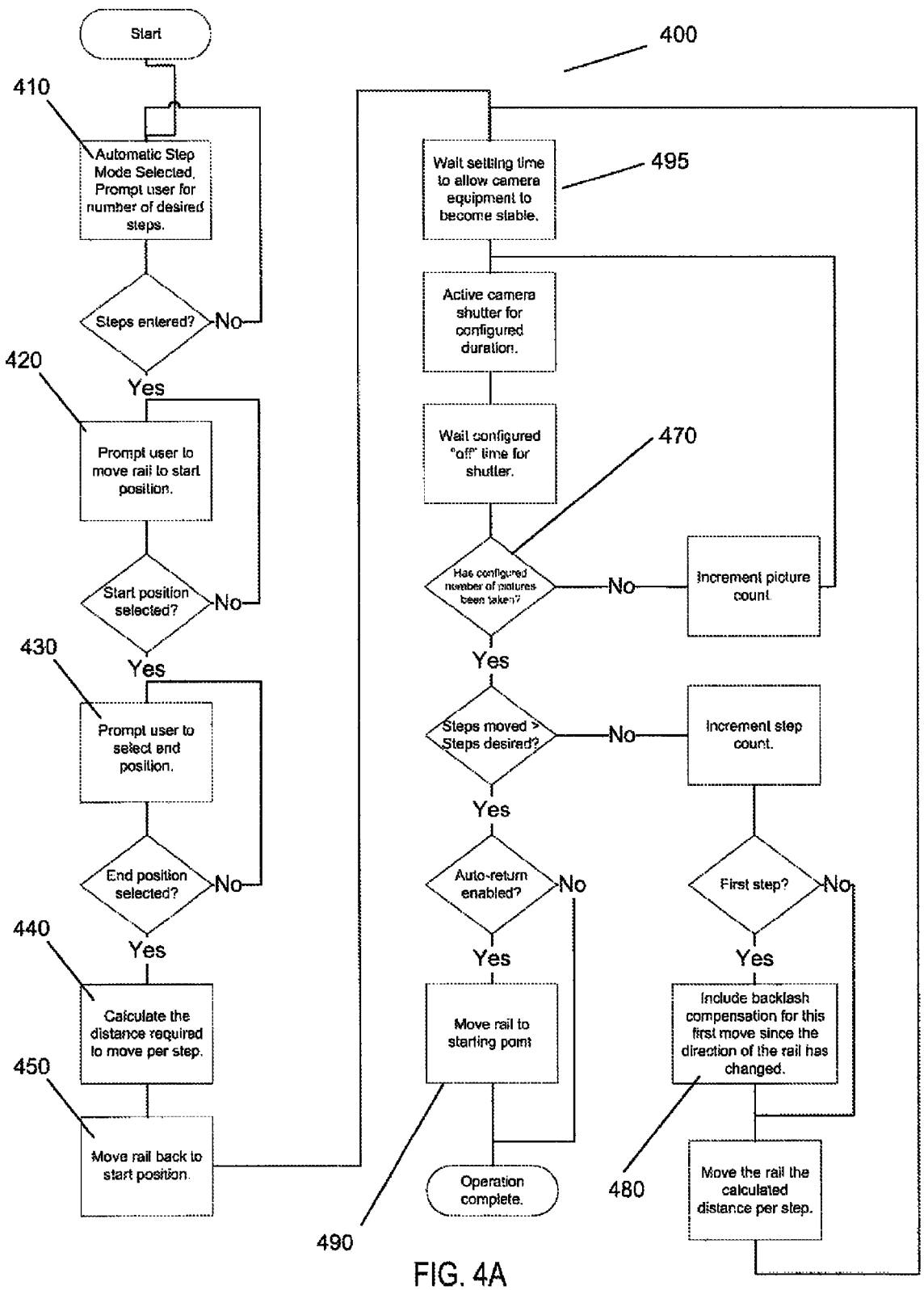
FIG. 4A is a flow diagram illustrating another process that may be carried out with the macro photography system of FIG. 1.
Figure 4B:
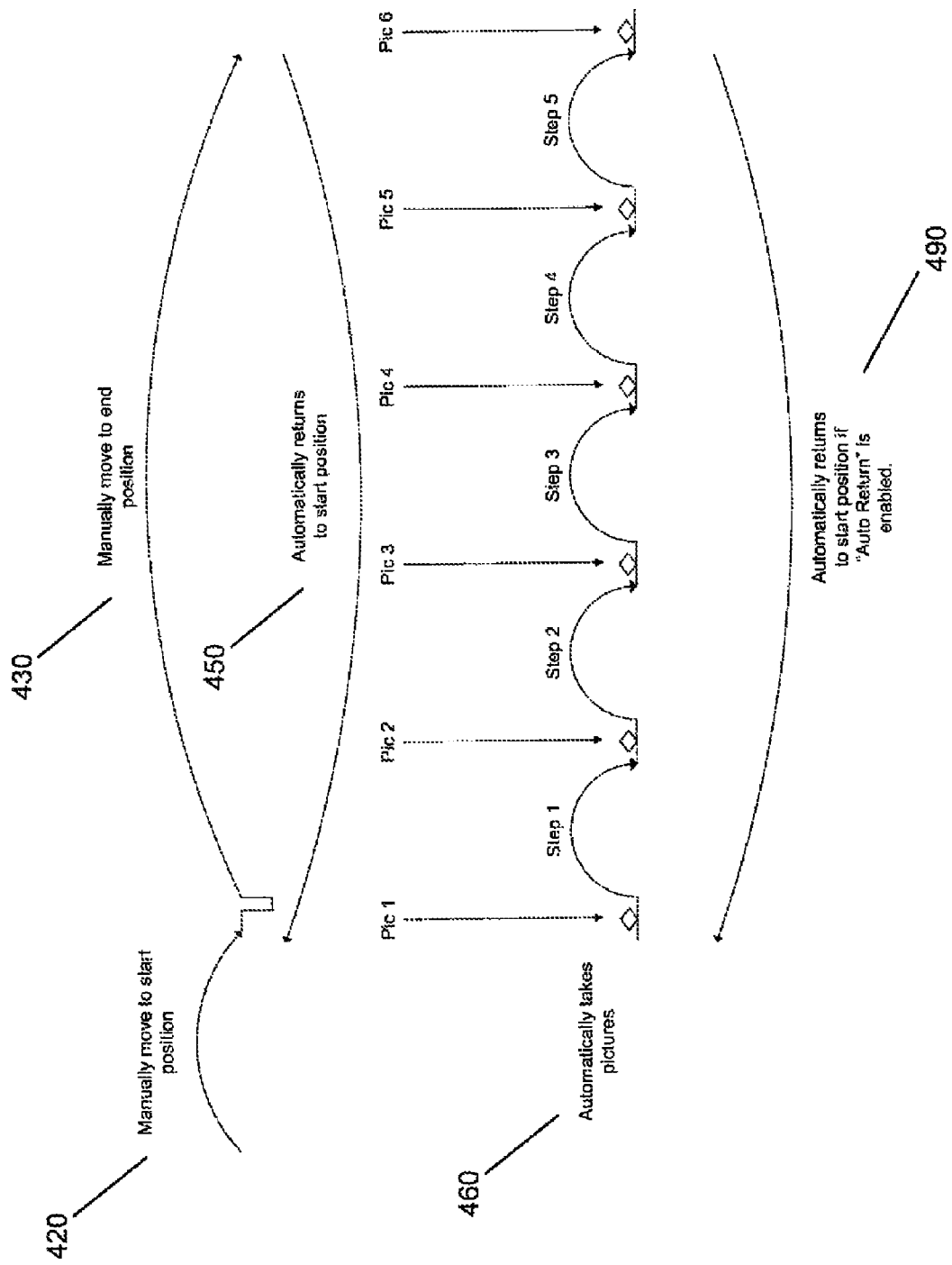
FIG. 4B is a timing diagram illustrating the process of capturing photographs shown in FIG. 4A.

Referring now to FIGS. 4A and 4B, a detailed flow diagram 400 and timing diagram 402 are shown respectively, illustrating the automatic step operating mode. The process 400 commences at step 410 when the user is prompted to enter operating parameters including a beginning position of the carriage 1340 at step 420 and an ending position of the carriage 1340 at step 430 as well as a desired total number of pictures. The controller module 1120 calculates a distance per step/interval value based on the entered parameters at step 440 and then moves the carriage 1340 to the starting position at step 450. The controller module then initiates the picture capturing process at step 460. During operation the controller module 1120 tracks a total picture count along with a total step/interval count. As shown the controller module 1120 determines that the picture capturing process has completed at step 470 by determining if the tracked number of pictures taken exceeds a configured number of pictures and if the tracked steps moved exceeds the desired number of steps. As shown, the process may also include performing backlash compensation at step 480 upon determining that the current step is the first step being taken. The process may also include a step 495 of waiting a predetermined settling time to allow the equipment (e.g. macro rail assembly and camera) to become stable and/or allow the flash time to recharge prior to activating the camera shutter. As shown, camera parameters such as a configured "off" time and shutter activation time may also be provided as operating parameters. The carriage 1340 may also automatically be returned at step 490 to a starting position when an auto-return parameter is selected.

Figure 5A:
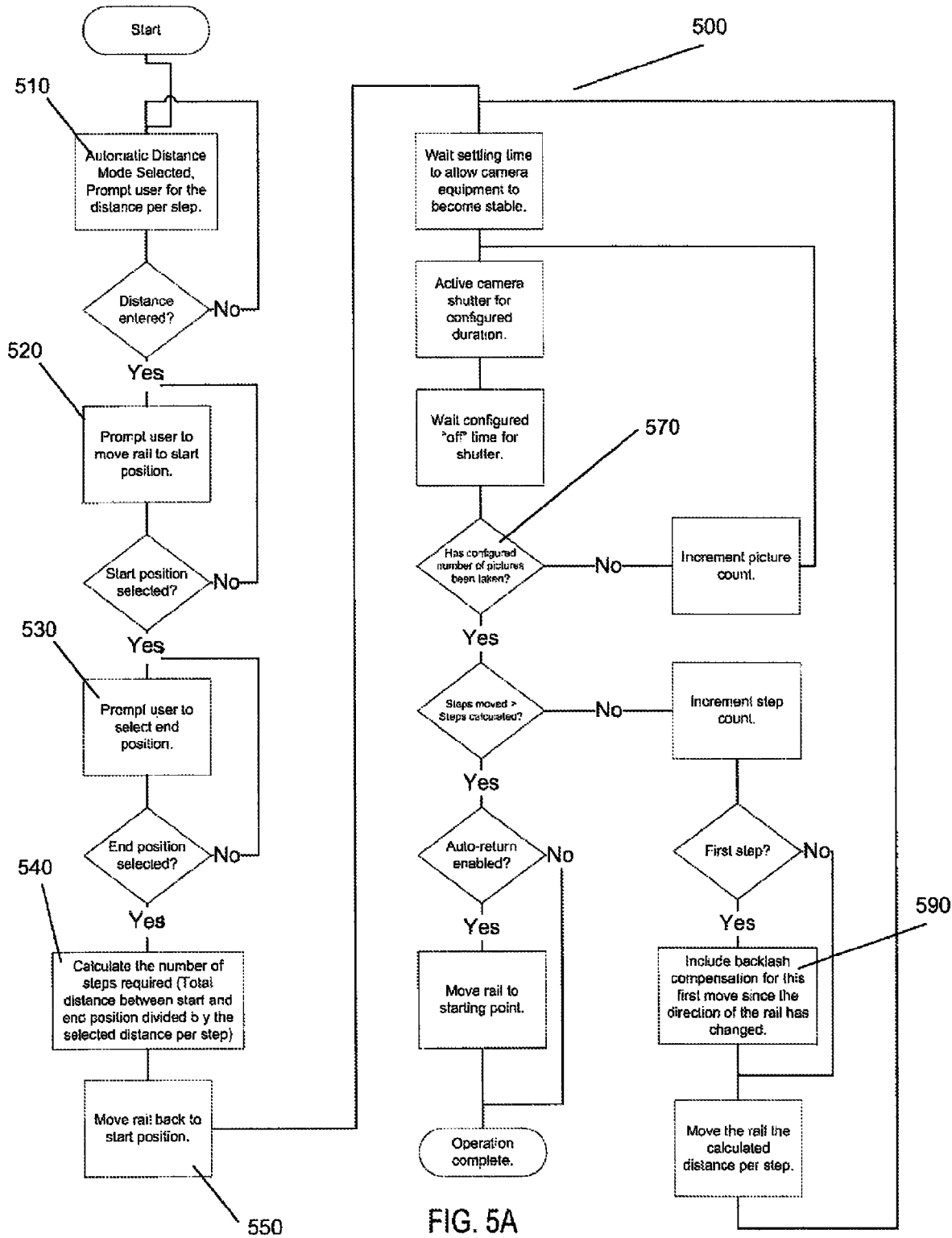
FIG. 5A is a flow diagram illustrating another process that may be carried out with the macro photography system of FIG. 1.
Figure 5B:
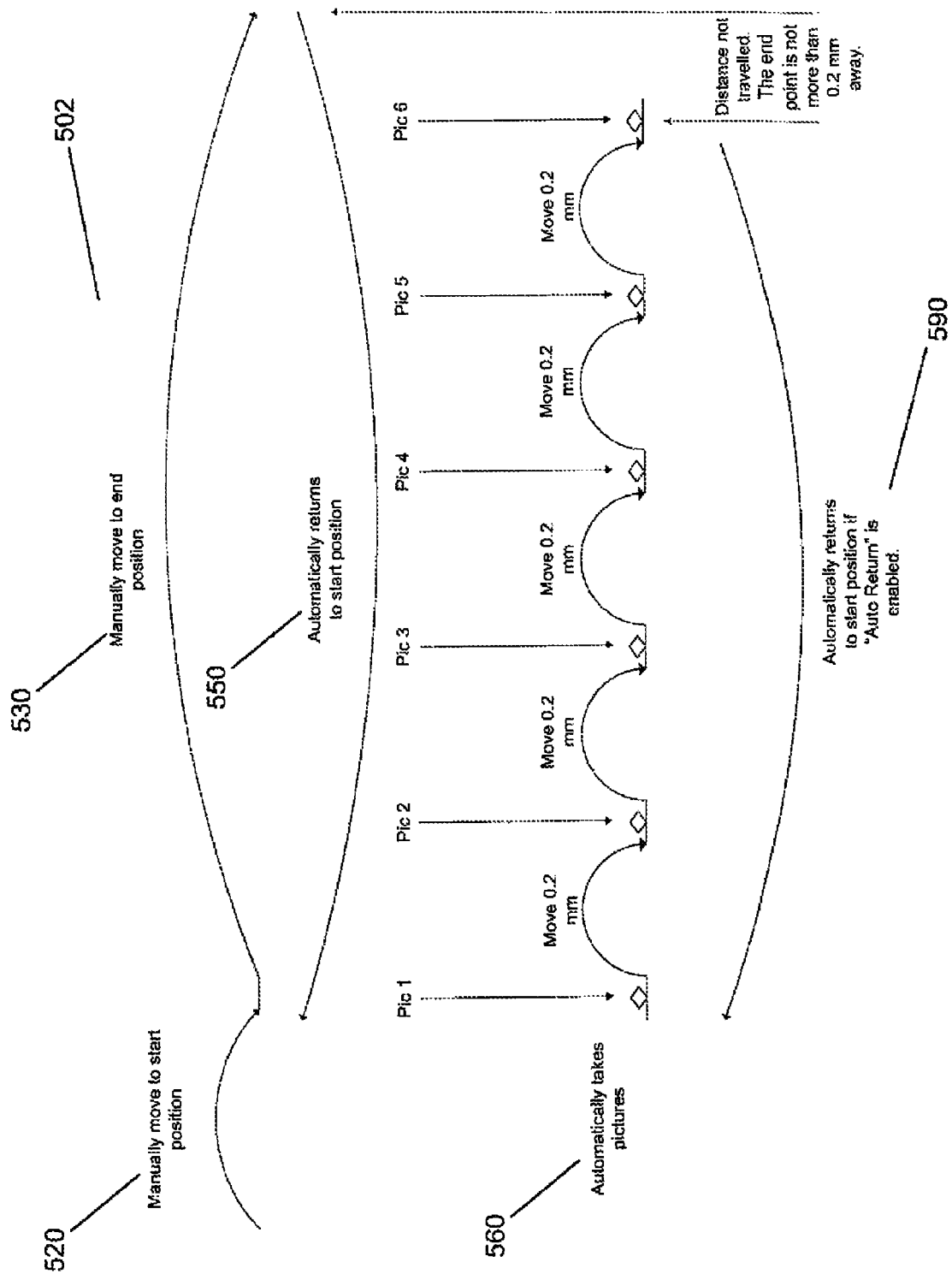
FIG. 5B is a timing diagram illustrating the process of capturing photographs shown in FIG. 5A.

Referring now to FIGS. 5A and 5B, a detailed flow diagram 500 and timing diagram 502 are shown respectively, illustrating the automatic distance operating mode. The process 500 commences at step 510 when the user is prompted to enter operating parameters including a beginning position of the carriage 1340 at step 520 and an ending position of the carriage 1340 at step 530 as well as a distance per step or interval value. The controller module 1120 then calculates at step 540 a "total number of steps" value based on the entered parameters and then moves the carriage 1340 to the starting position at step 550. The controller module then initiates the picture capturing process at step 560. During operation the controller module 1120 tracks a total picture count along with a total step count. As shown the controller module 1120 determines at step 570 that the picture capturing process has completed by determining if the tracked number of pictures taken exceeds a configured number of pictures and if the tracked steps moved exceeds the desired number of steps. As shown, the process may also include a step 590 of performing backlash compensation and handle additional operating parameters related to the carriage 1340 movement and camera operation as previously discussed.

Figure 6A:
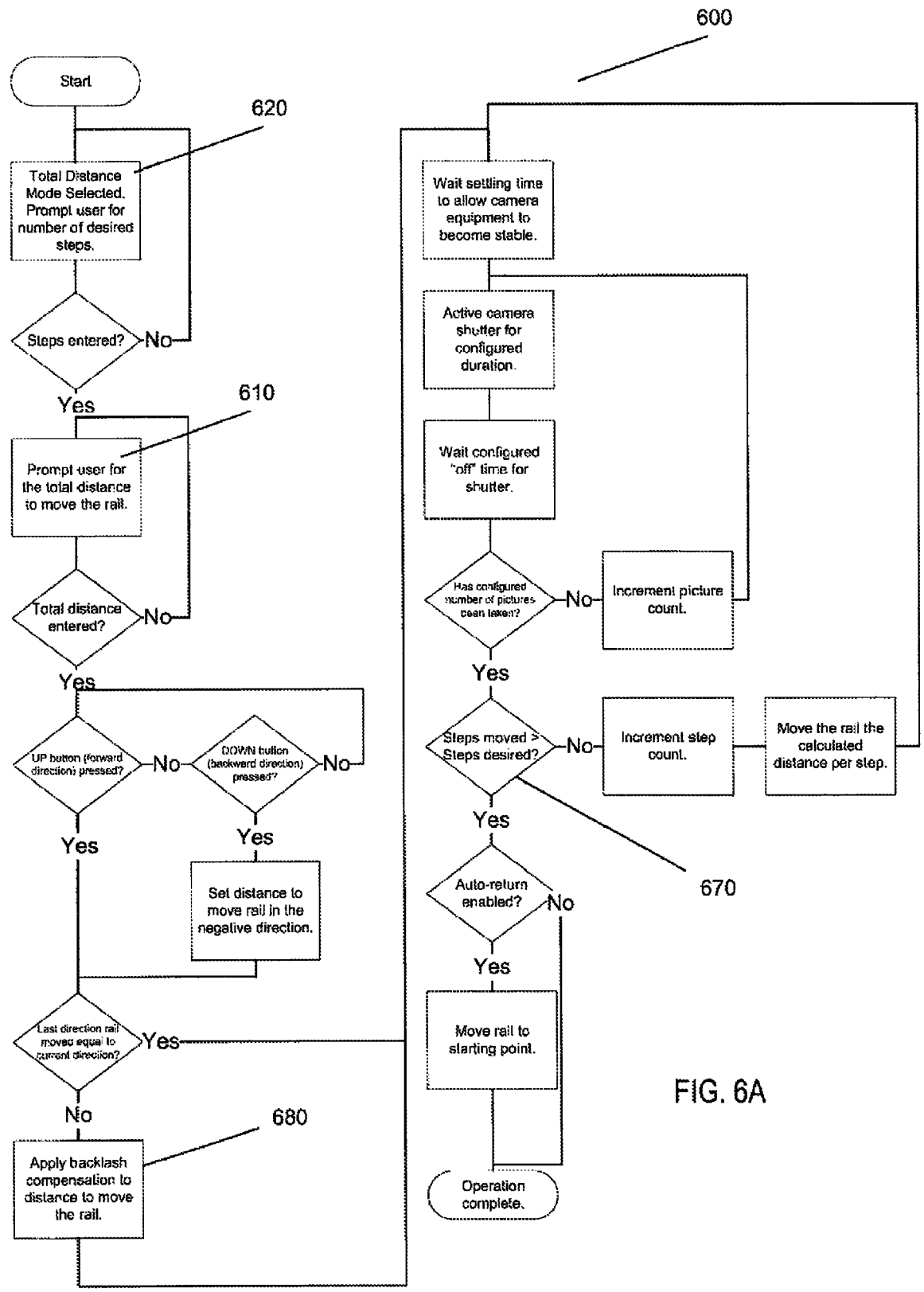
FIG. 6A is a flow diagram illustrating another process that may be carried out with the macro photography system of FIG. 1.
Figure 6B:
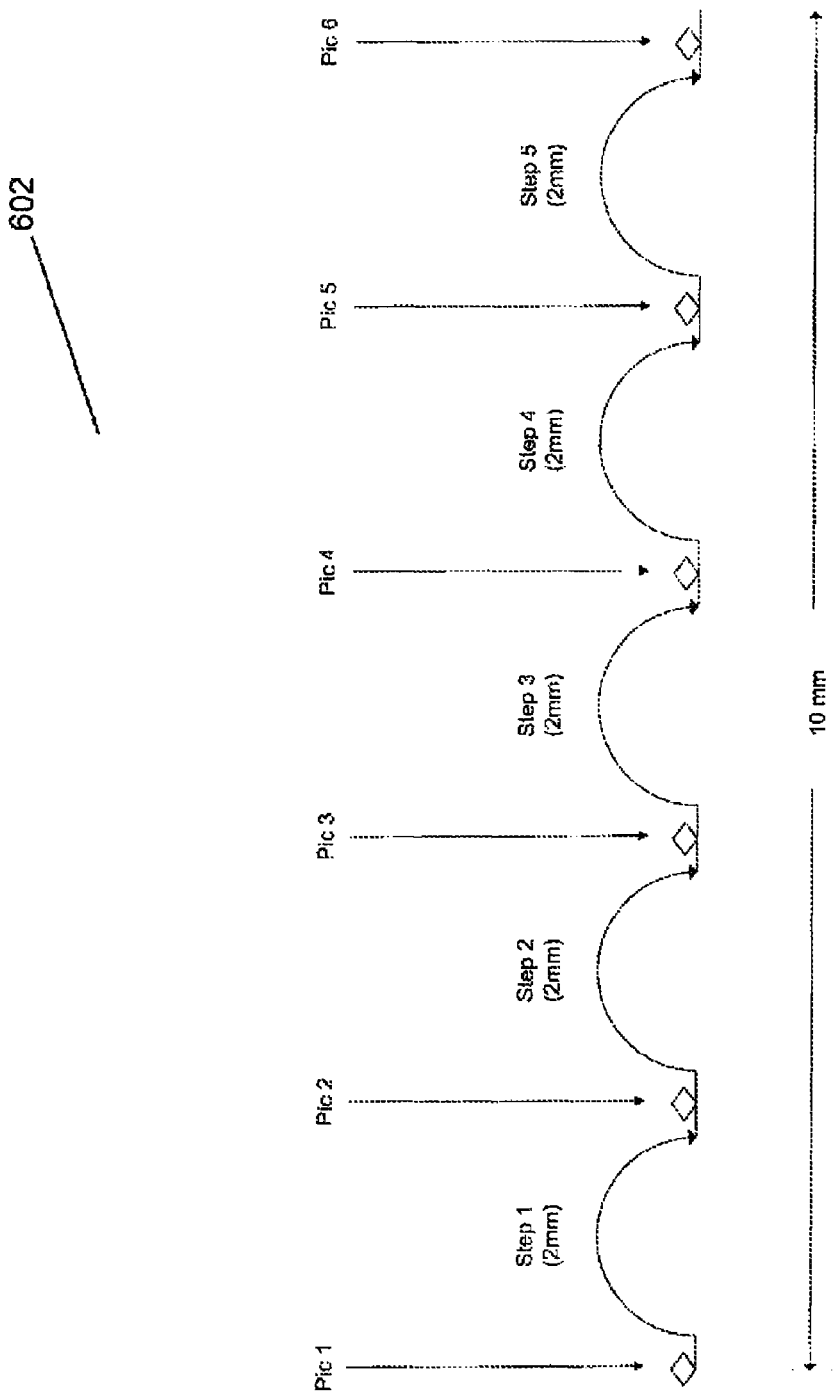
FIG. 6B is a timing diagram illustrating the process of capturing photographs shown in FIG. 6A.

Referring now to FIGS. 6A and 6B, a detailed flow diagram 600 and timing diagram 602 are shown respectively, illustrating the total distance operating mode. The process 600 commences when the user is prompted to enter operating parameters including a total distance the carriage 1340 will travel at step 610 as well as the number of steps or intervals to use in that given distance at step 620. The controller module 1120 then calculates a distance per step value based on the entered parameters. FIG. 6B shows an exemplary timing diagram 602 in which the total distance entered is 10 mm and the calculated distance per step is 2 mm. It is noted that these values are shown for illustrative purposes only. During operation the controller module 1120 tracks a total picture count along with a total step count. As shown the controller module 1120 determines that the picture capturing process has completed at step 670 by determining if the tracked number of pictures taken exceeds a configured number of pictures and if the tracked steps moved exceeds the desired number of steps. As shown, the process 600 may also include a step 680 of performing backlash compensation and handle additional operating parameters related to the carriage 1340 movement and camera operation as previously discussed.

Figure 7A:
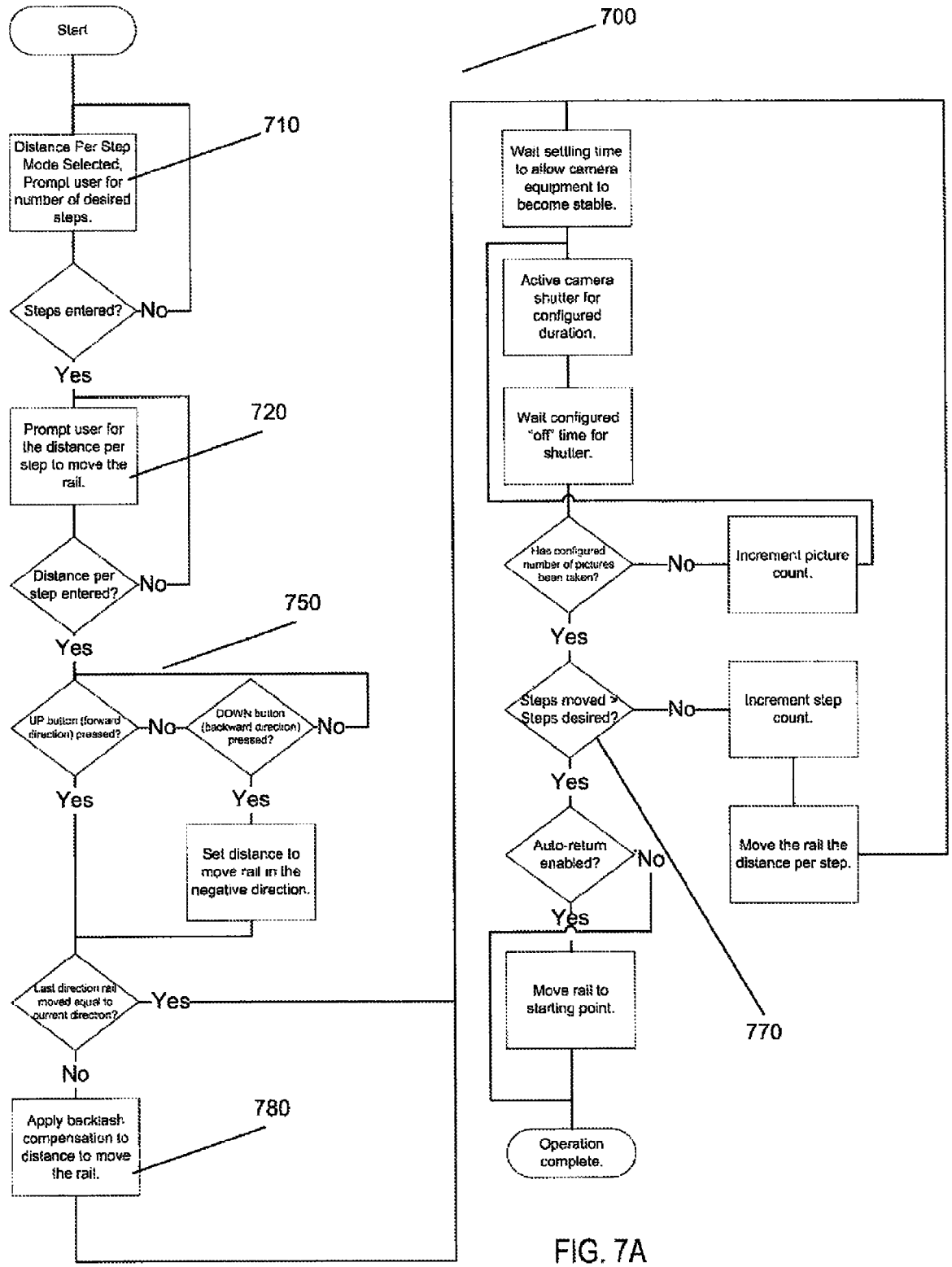
FIG. 7A is a flow diagram illustrating another process that may be carried out with the macro photography system of FIG. 1.
Figure 7B:
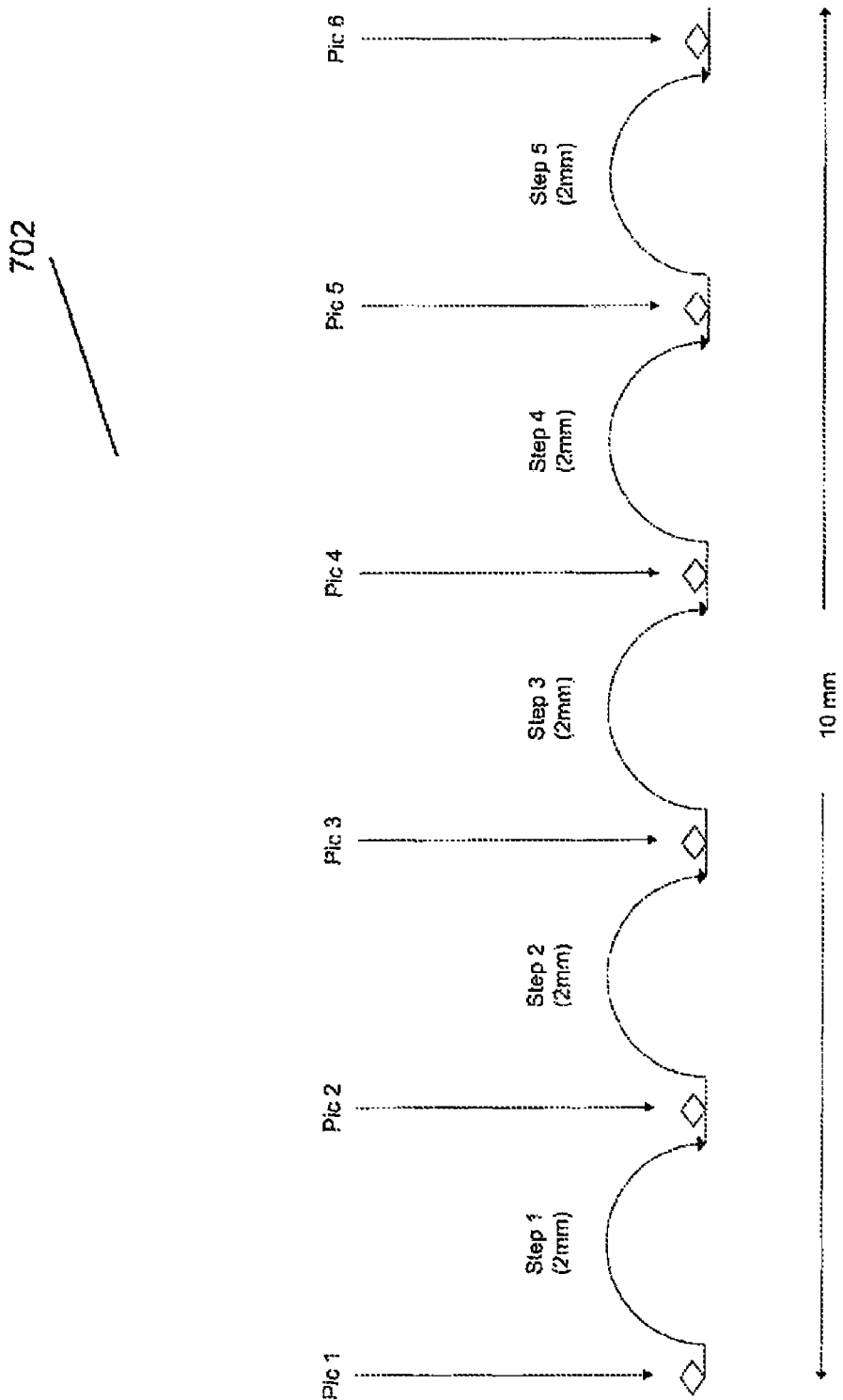
FIG. 7B is a timing diagram illustrating the process of capturing photographs shown in FIG. 7A.

Referring now to FIGS. 7A and 7B, a detailed flow diagram 700 and timing diagram 702 are shown respectively, illustrating the distance per step operating mode. The process 700 commences when the user is prompted to enter operating parameters including a distance per step or interval value at step 720 as well as the total number of steps or intervals at step 710. FIG. 7B shows an exemplary timing diagram 702 in which the total number of steps entered is five and the entered distance per step is 2 mm. It is noted that these values are shown for illustrative purposes only. During operation the controller module 1120 tracks a total picture count along with a total step count. As shown the controller module 1120 determines that the picture capturing process has completed at step 770 by determining if the tracked number of pictures taken exceeds a configured number of pictures and if the tracked steps moved exceeds the desired number of steps. Another step 750 of allowing the user to select the direction (e.g. forward or backward) of the carriage 1340 may also be included. As shown, the process may also include a step 780 of performing backlash compensation and handle additional operating parameters related to the carriage movement and camera operation as previously discussed.

Figure 8A:
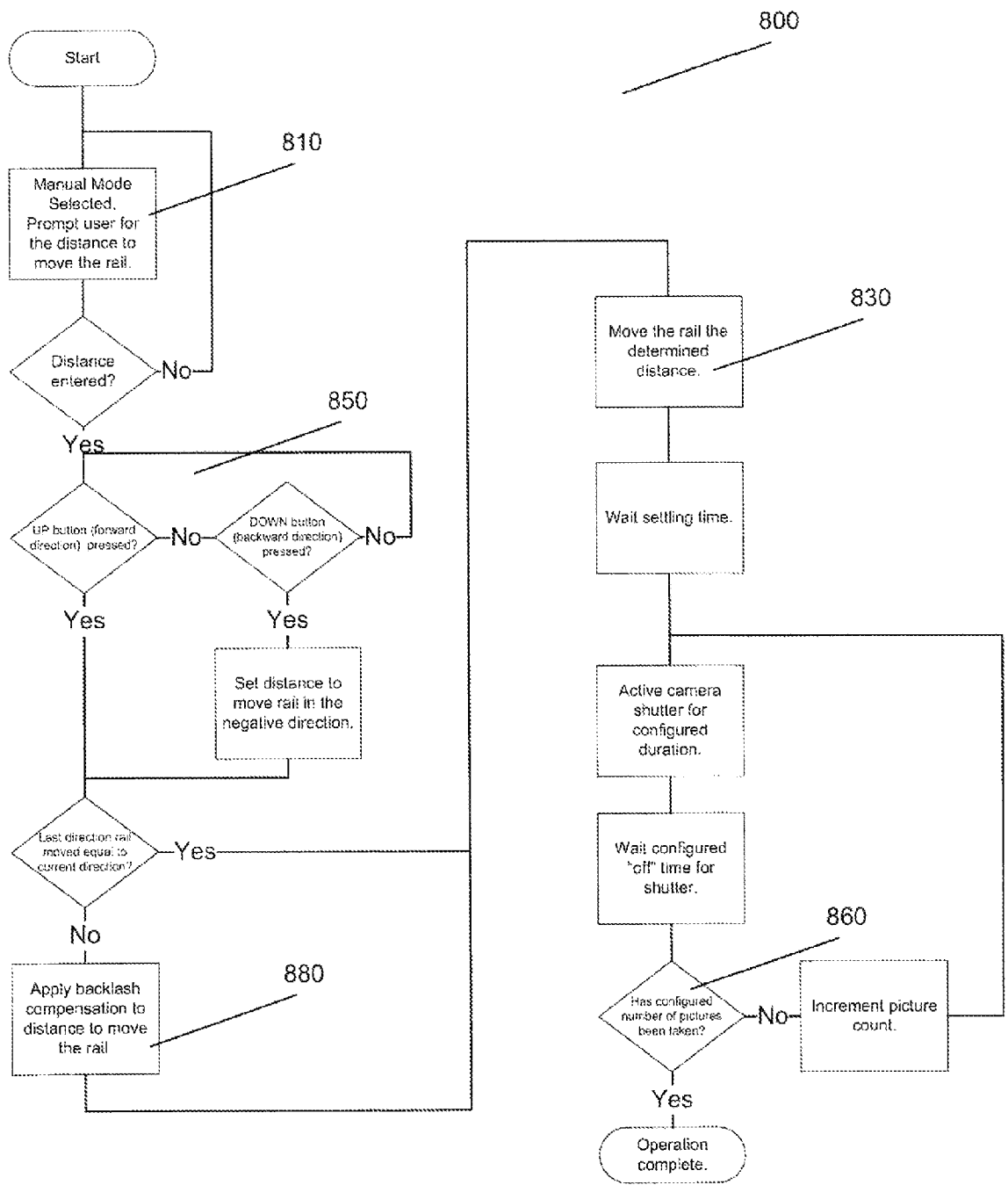
FIG. 8A is a flow diagram illustrating another process that may be carried out with the macro photography system of FIG. 1.
Figure 8B:
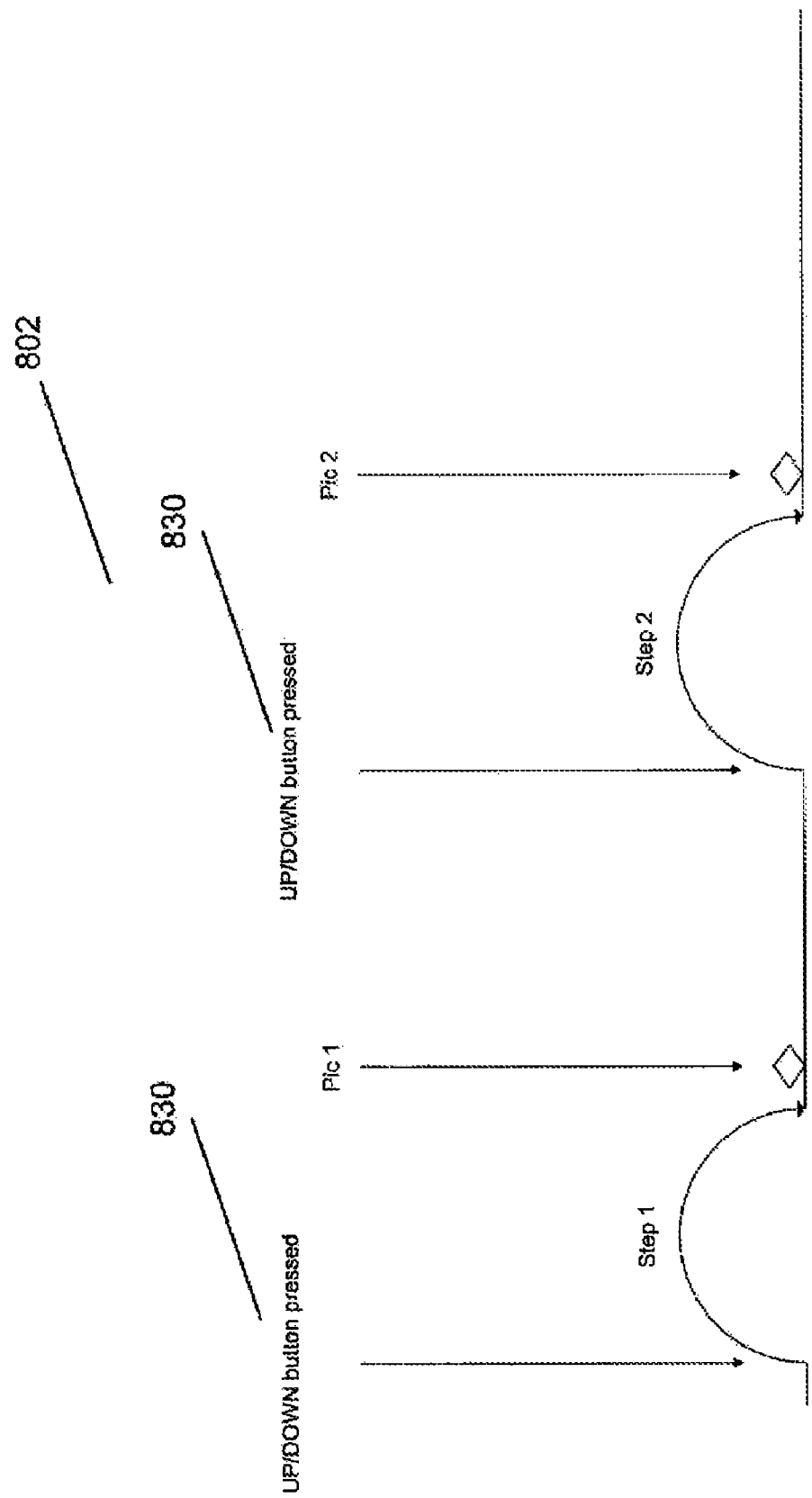
FIG. 8B is a timing diagram illustrating the process of capturing photographs shown in FIG. 8A.

Referring now to FIGS. 8A and 8B, a detailed flow diagram 800 and timing diagram 802 are shown respectively, illustrating the manual operating mode. The process 800 commences when the user is prompted at step 810 to enter operating parameters including a distance per step value. During operation the controller module 1120 allows the user to determine when the carriage 1340 is advanced. Each time the user presses an "Up" or "Down" button on the user interface 1130, the controller module 1120 advances 830 the carriage 1340 another step or interval. As shown the controller module 1120 determines at step 860 that the picture capturing process has completed by determining if the tracked number of pictures taken exceeds a configured number of pictures. Another step 850 of allowing the user to select the direction (e.g. forward or backward) of the carriage 1340 may also be included. As shown, the process may also include a step 880 of performing backlash compensation and handle additional operating parameters related to the carriage movement and camera operation as previously discussed.

Figure 9A:
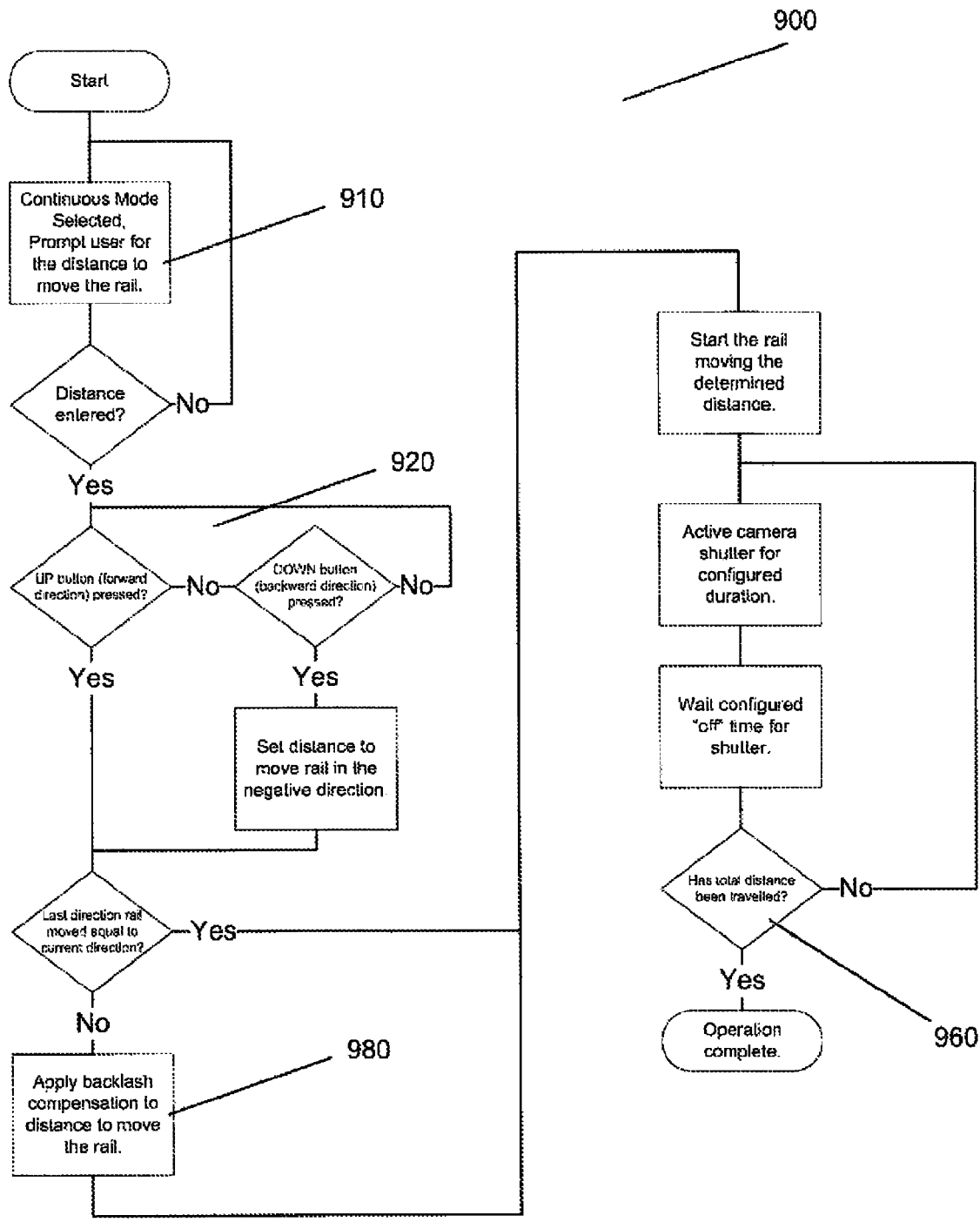
FIG. 9A is a flow diagram illustrating another process that may be carried out with the macro photography system of FIG. 1.
Figure 9B:
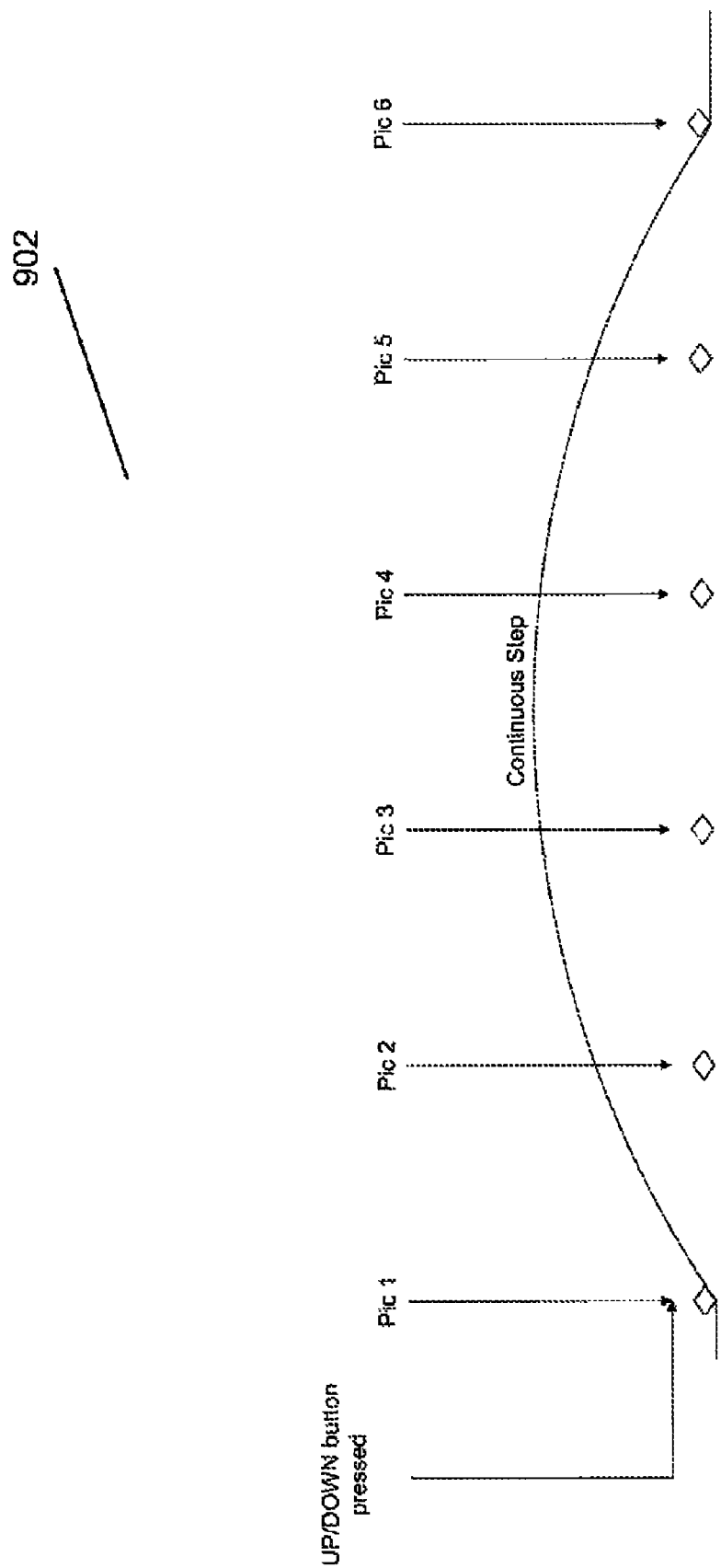
FIG. 9B is a timing diagram illustrating the process of capturing photographs shown in FIG. 9A.

Referring now to FIGS. 9A and 9B, a detailed flow diagram 900 and timing diagram 902 are shown respectively, illustrating the continuous operating mode. The process 900 commences when the user is prompted at step 910 to enter operating parameters including the total distance to move the carriage 1340 during operation. During operation the camera, the shutter and/or flash trigger will fire continuously. A shutter trigger pulse time and off time ultimately determine the number of pictures that may be taken during the carriage move. During operation the controller module 1120 also tracks the current distance traveled and determines that the picture capturing process has completed at step 960 by determining when the tracked distance exceeds the entered total distance. Another step 920 of allowing the user to select the direction (e.g. forward or backward) of the carriage 1340 may also be included. As shown, the process may also include a step 980 of performing backlash compensation and handle additional operating parameters related to the carriage movement and camera operation as previously discussed.

Figure 10:
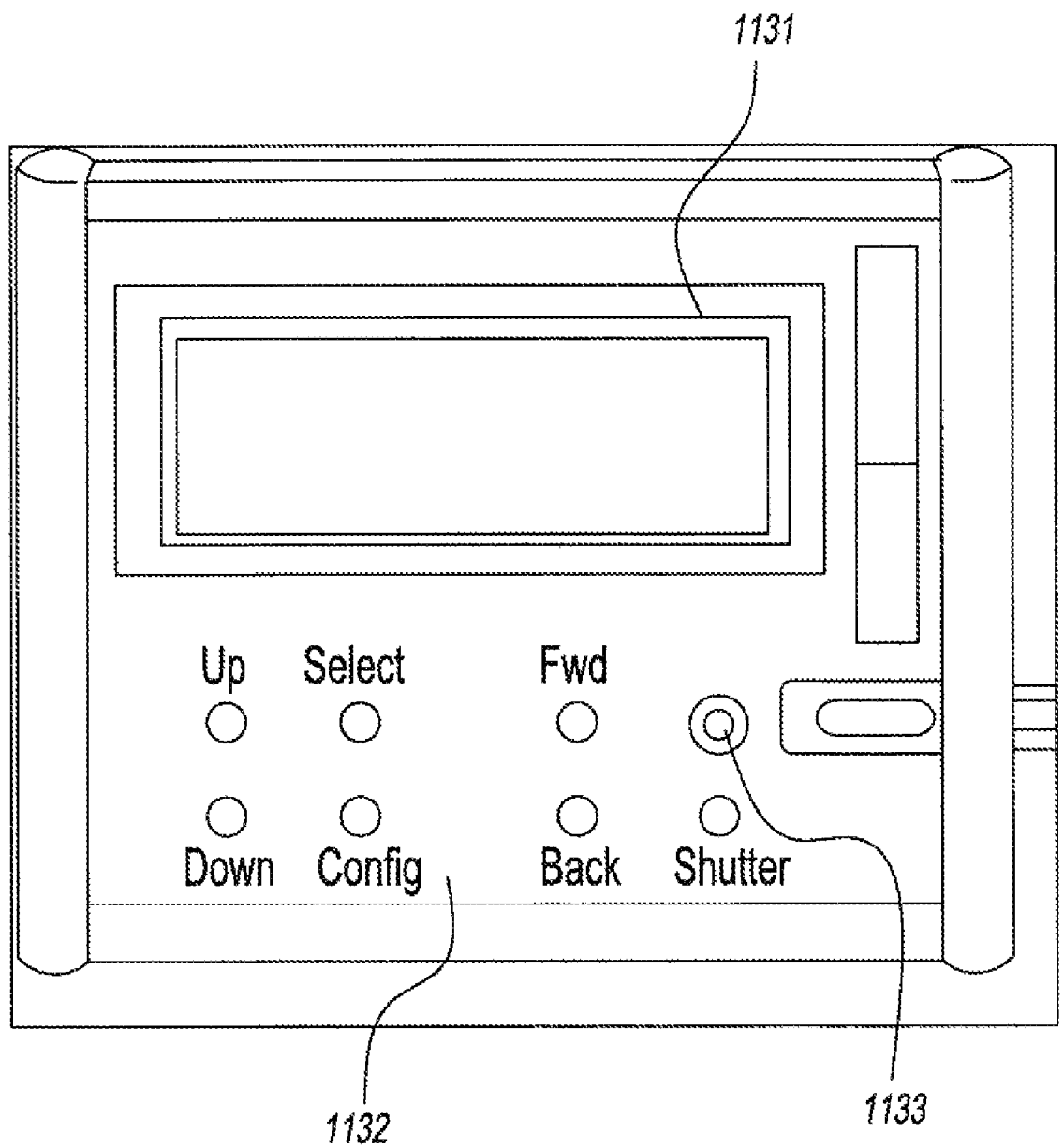
FIG. 10 is a perspective view of the controller assembly of FIG. 1.

Referring now to FIG. 10, a diagram is shown illustrating the user interface 1130 components of the controller assembly 1100. As discussed, the user interface 1130 components may include an LCD display device 1131, a switchboard assembly 1132 (also shown in FIG. 11D) and interface connection components such as an LCD interface connector (shown in FIG. 11C). The switchboard assembly 1132 may include a plurality of buttons for allowing a user to enter operating parameters and to control operation of the macro rail assembly 1300 and camera 1200. The aforementioned "buttons" may take multiple formats suitable for allowing the user to enter operating parameters, including but not limited to a touch-screen interface. The switchboard assembly 1132 may include an LED 1133 for indicating to a user that the controller module 1120 has issued instructions to be performed by the camera 1200 or macro rail assembly 1300 (e.g. a shutter, flash or carriage movement).

Figure 11A:
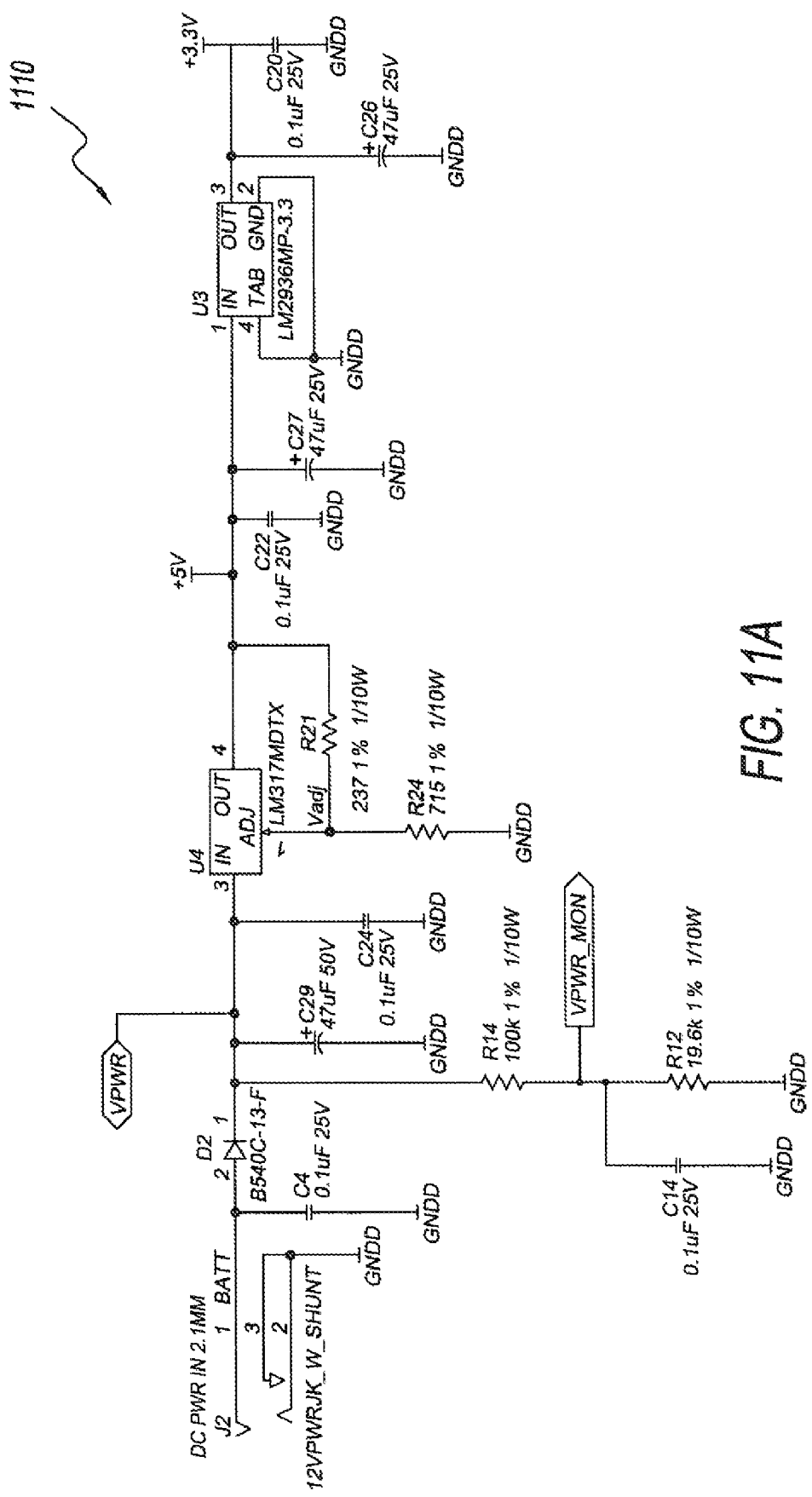
FIG. 11A is a schematic circuit diagram representation of the power supply shown in FIG. 1.

Referring now to FIG. 11A, a schematic circuit diagram representation of the power supply 1110 of FIG. 1 is shown. The power supply module 1110 may include electrical components responsible for conditioning an input voltage and regulating it to a voltage that is suitable for the other components of the system 1. A reverse-battery protection feature may also be included for mitigating risk of damage to the controller should the wrong polarity voltage be applied.

Figure 11B:
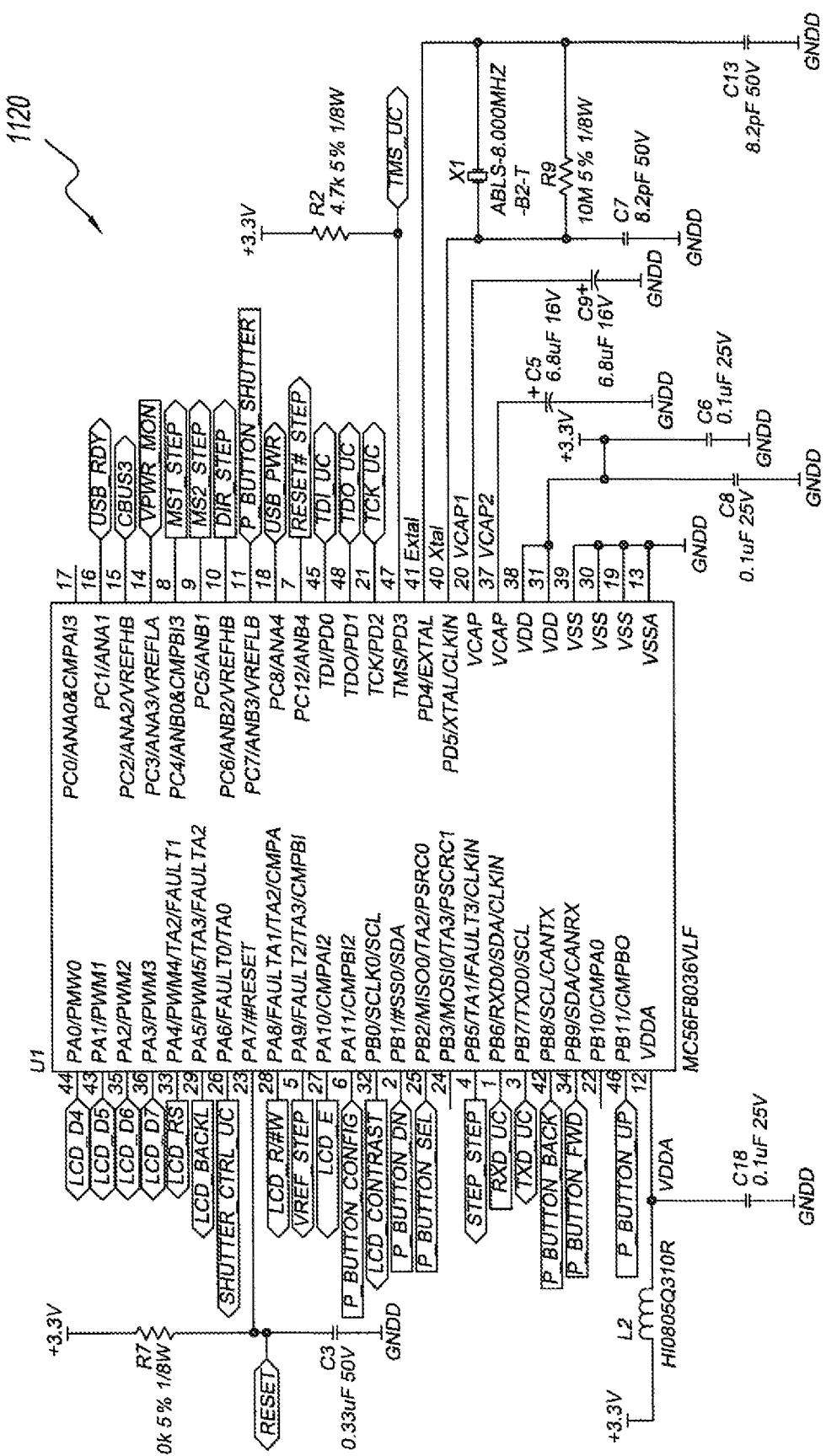
FIG. 11B is a schematic circuit diagram representation of the controller module 1120 shown in FIG. 1.

Referring now to FIG. 11B, a schematic circuit diagram representation of the controller module 1120 of FIG. 1 is shown. The controller module 1120 is responsible for coordinating inputs (e.g. buttons, triggers) and outputs (e.g. LCD, LED, motor control) to and from the user interface 1130, the camera 1200 and the macro rail assembly 1300. By way of example, the controller module 1120 may be a microprocessor programmed to perform the functions of coordinating such inputs and outputs. The controller module 1120 may be electrically coupled to the power supply 1110, the computer I/O module 1150, the shutter control module 1140, the motor drive module 1160 and components of the user interface module 1130 including the switchboard 1132 assembly and the LCD display 1131.

Figure 11C:
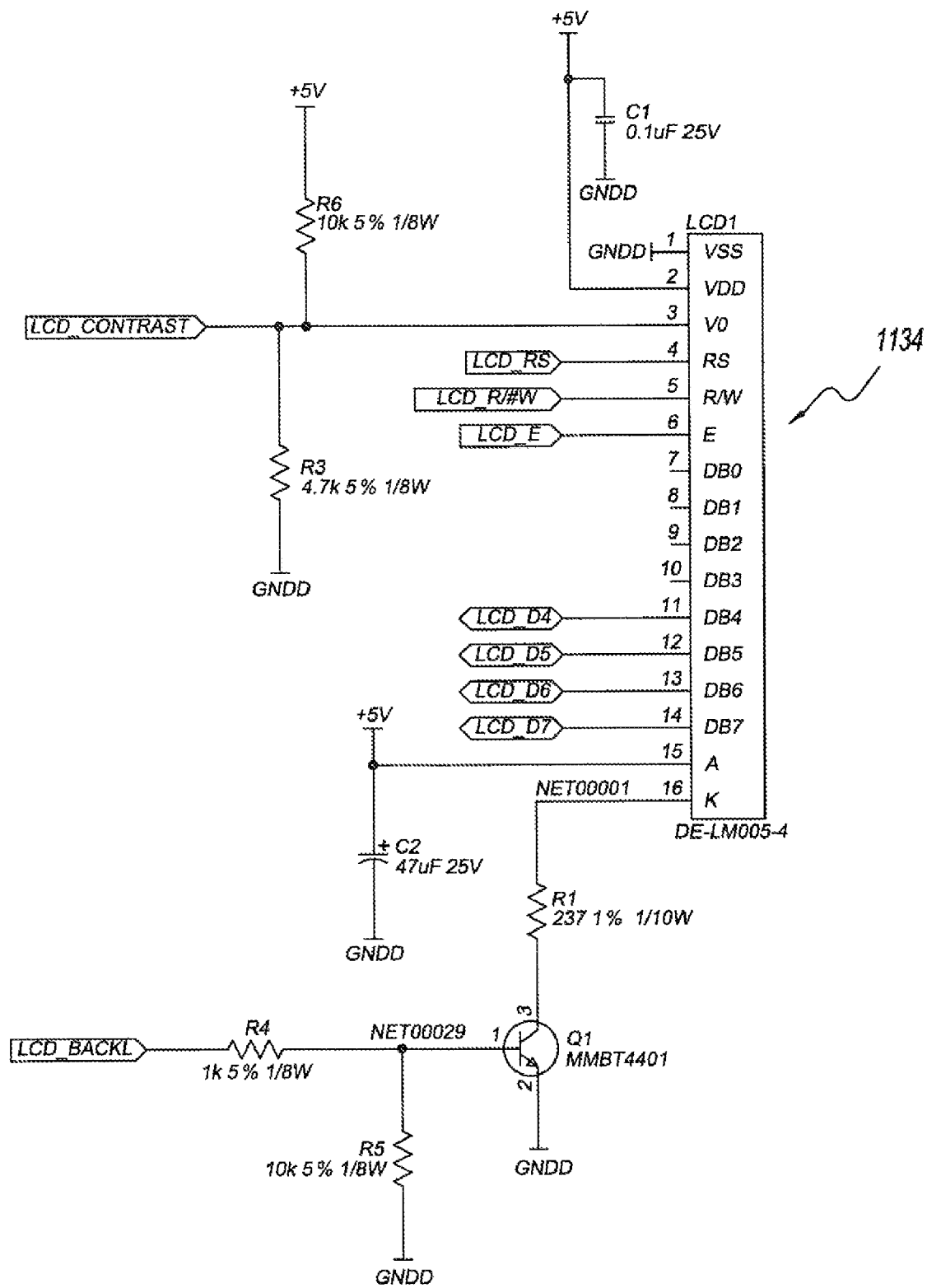
FIG. 11C is a schematic circuit diagram representation of an exemplary LCD display interface connector.

Referring now to FIG. 11C, a schematic circuit diagram representation of an exemplary LCD display interface connector 1134 is shown. The LCD display interface connector is configured to connect the controller module 1120 with the LCD display 1131.

Figure 11D:
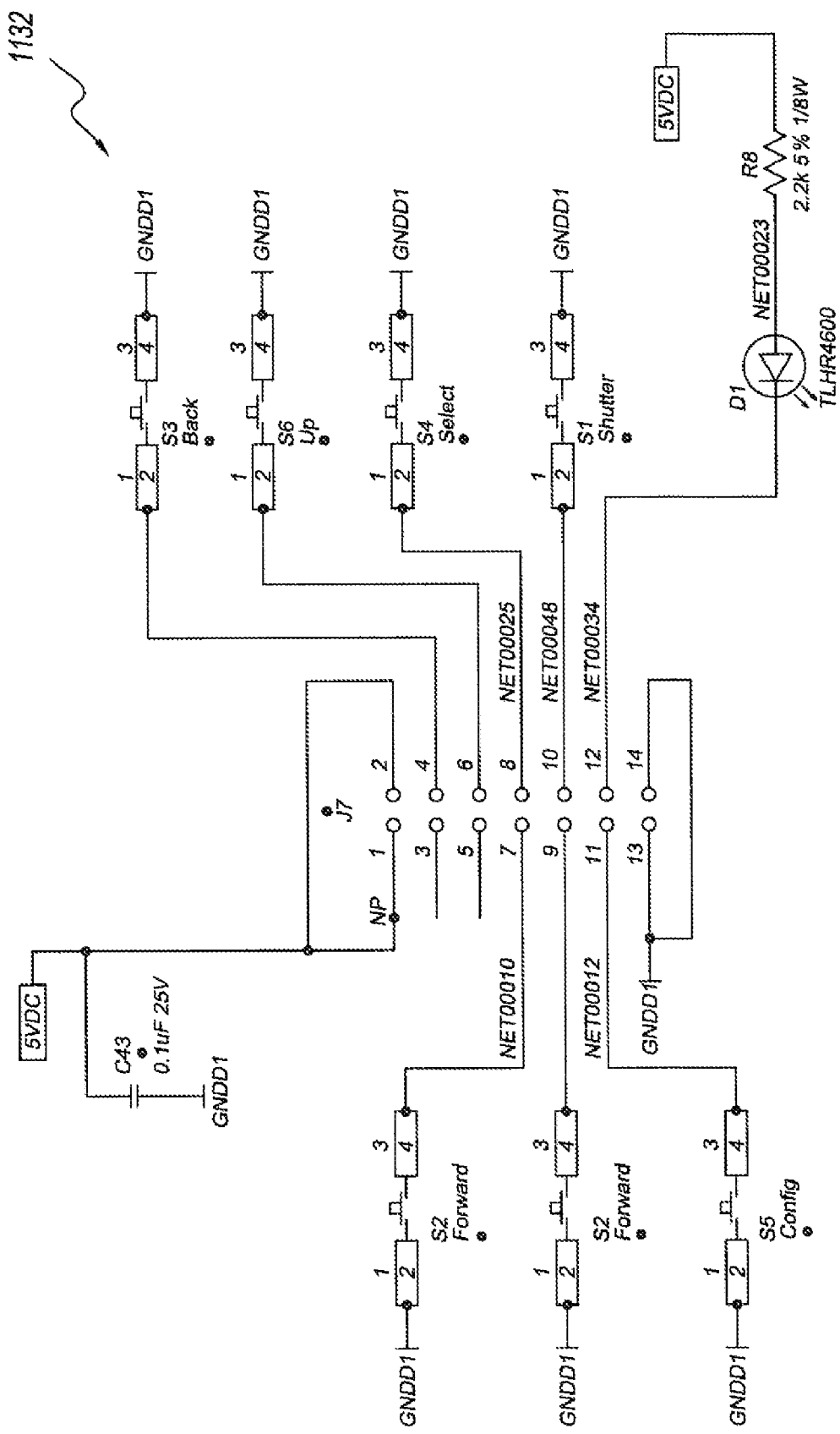
FIG. 11D is a schematic circuit diagram representation of a switch-board assembly.

Referring now to FIG. 11D, a schematic circuit diagram representation of an exemplary switch-board assembly 1132 is shown. The switch-board assembly 1132 contains seven buttons and an LED (output/shutter/flash indicator).

Figure 11E:
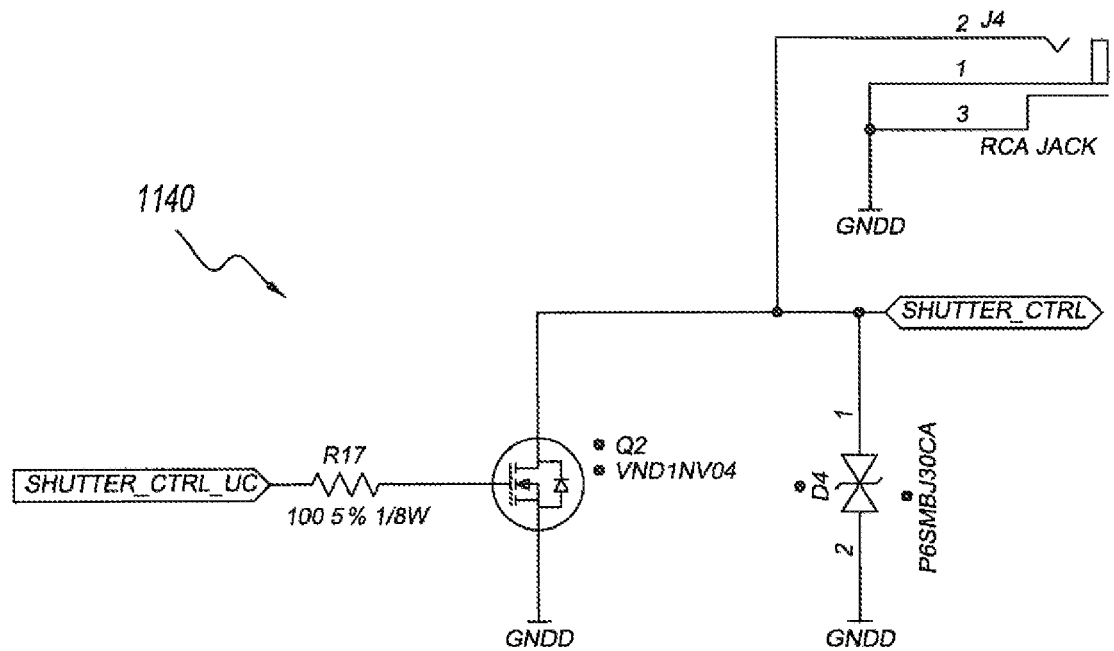
FIG. 11E is a schematic circuit diagram representation of the shutter control module shown in FIG. 1.

Referring now to FIG. 11E, a schematic circuit diagram representation of the shutter control module 1140 of FIG. 1 is shown. The shutter control module 1140 is responsible for activating the camera 1200 shutter or flash. An RCA jack may be included for allowing an interface cable such as an RCA cable to communicatively couple the shutter control module 1140 to the camera 1200.

Figure 11F:
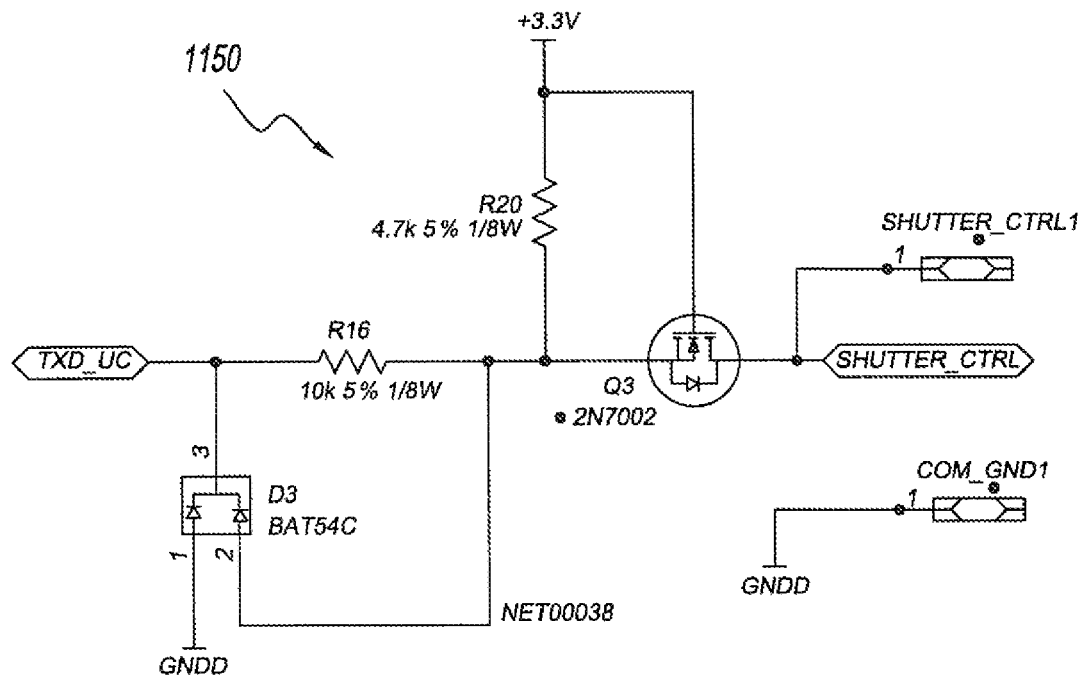
FIG. 11F is a schematic circuit diagram representation of the computer I/O module shown in FIG. 1.

Referring now to FIG. 11F, a schematic circuit diagram representation of the computer I/O module of FIG. 1 is shown. The computer I/O module 1150 is configured to support communication between the controller assembly 1100 and an external computer (not shown) to support transmission of data (e.g. image data) for external processing.

Figure 11G:
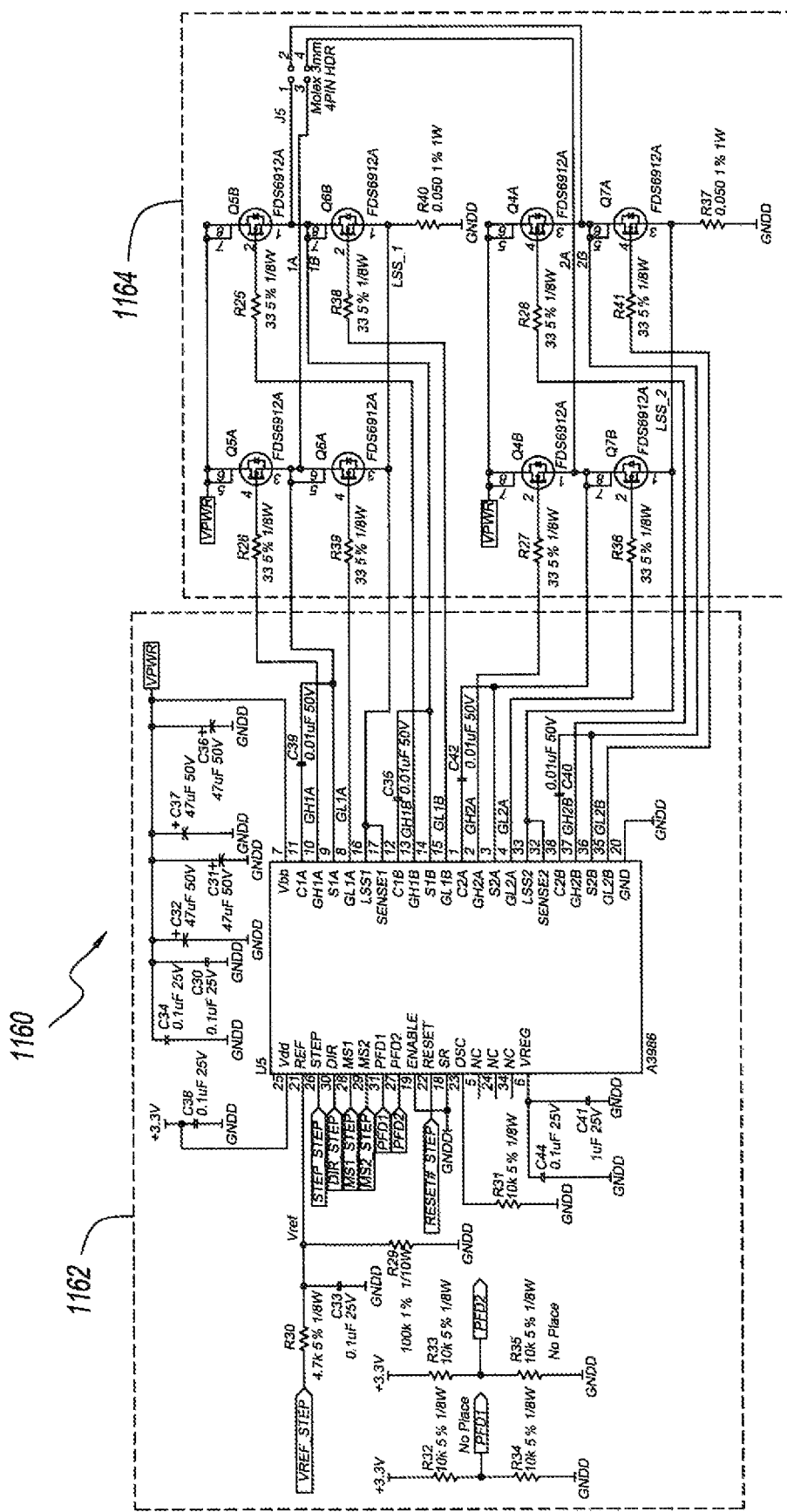
FIG. 11G is a schematic circuit diagram representation of the motor drive module shown in FIG. 1.
Figure 11H:
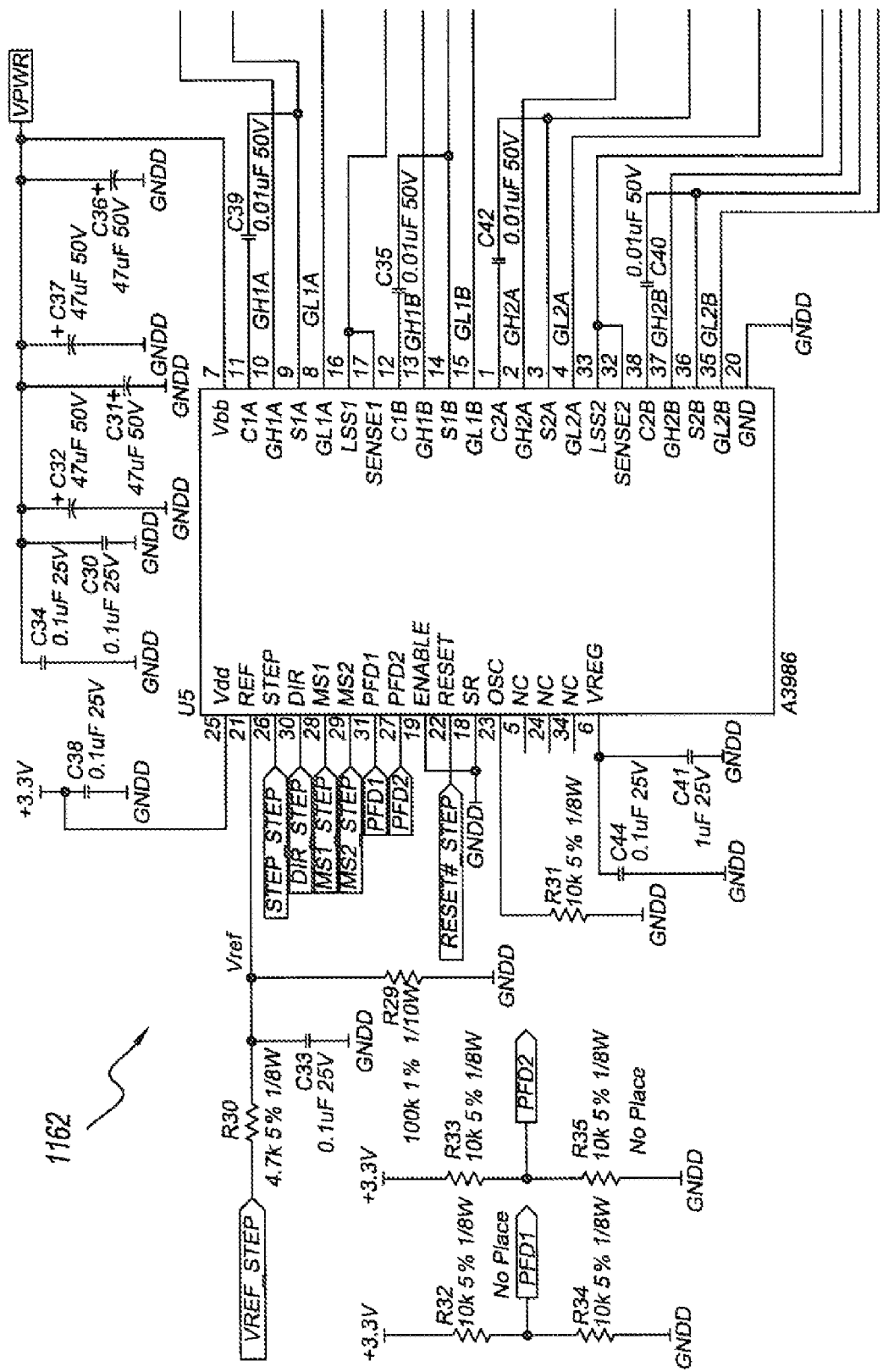
FIG. 11H is a detailed view of a section of the motor drive module of FIG. 11G.
Figure 11I:
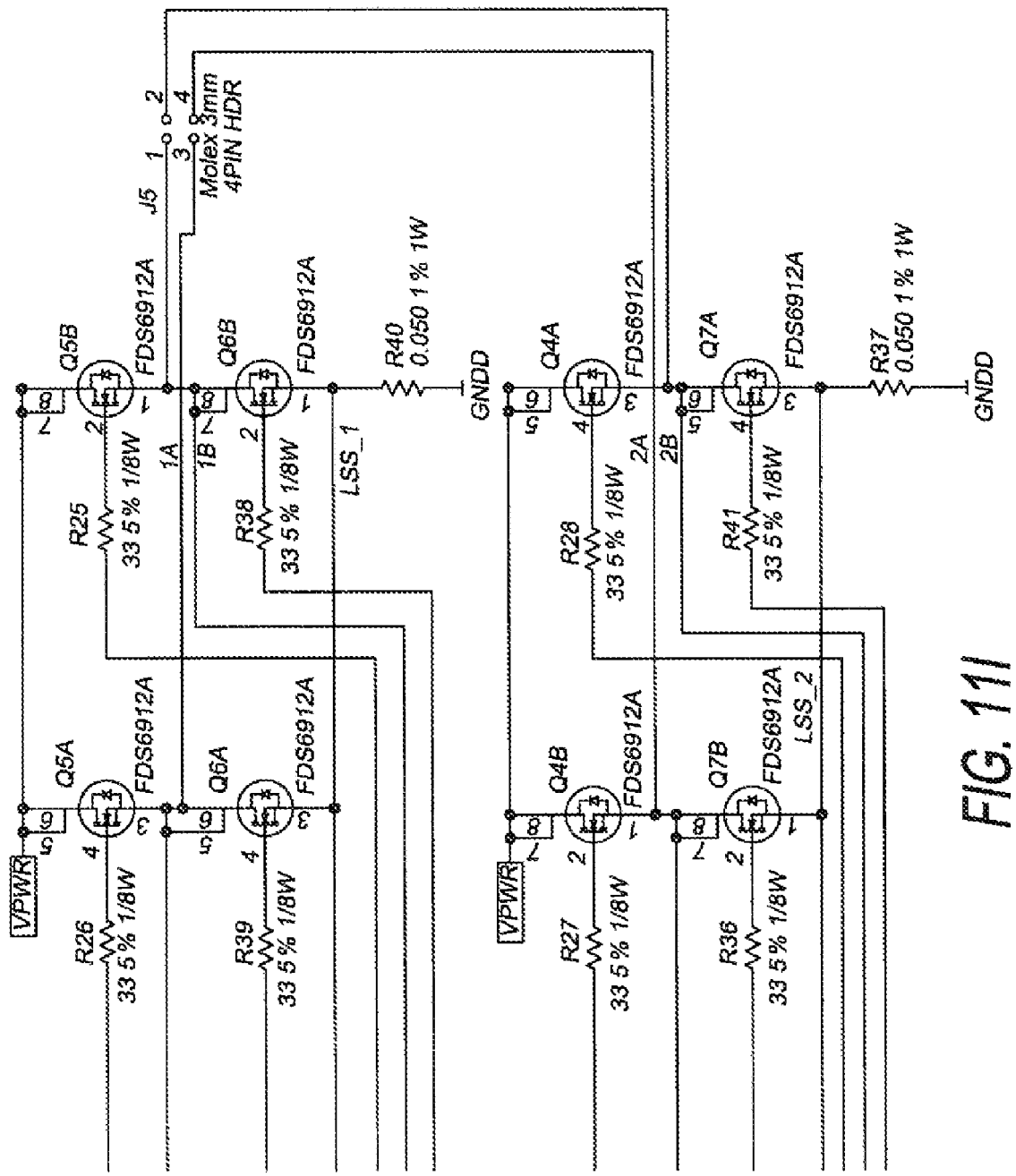
FIG. 11I is a detailed view of another section of the motor drive module of FIG. 11G.

Referring now to FIG. 11G, FIGS. 11H and 11I, schematic circuit diagram representations of the motor drive module of FIG. 1 are shown. The motor drive module 1160 is communicatively coupled to the microprocessor 1120 and the motor 1310 and is configured to transmit instructions to the motor 1310 suitable for controlling operating parameters (e.g. speed, torque, direction) of the motor. An interface cable may be used to connect the controller assembly 1100 to the motor 1310. As discussed, the motor 1310 may be a stepper motor such as a NEMA17 1.8 degree per full step motor (Model STP-MTR-17040) suitable for providing 61.4 oz-in of torque. The control module 1120 controls an integrated circuit and commands it to move the motor 1310 based on current operating conditions (e.g. at different speeds, torques, and directions). FIG. 11H illustrates a detailed section 1162 of the motor drive integrated circuit showing connections to the microprocessor and supply voltage. The integrated circuit in turn controls the transistors (as shown, eight transistors are included), turning them on at appropriate times and adjusting the current to match that of what the control module 1120 requests). FIG. 11I illustrates a detailed section 1164 showing the eight transistors, current sense resistors, and motor connector.

Thus, an improved device and a method for performing close-up focus stacking photography is contemplated. A motor controlled rail assembly is provided which simplifies and automates the process of capturing focus-stacked pictures. This device can be used to incrementally move a camera or other photographic device a programmable distance inward or outward in precise steps to facilitate focus-stacked photography. The device may include a motor-driven macro rail assembly, a controller assembly and a camera, which, generally speaking, are configured as follows: a camera is attached to a macro rail carriage which is driven by the motor and controller. The device may have different modes of operation (an automatic step mode, an automatic distance mode, a total distance mode, a distance per step mode, a continuous mode and a manual mode) to yield improved results in different situations. An improved macro photography device is thus contemplated that overcomes the limitations of known devices.

The various illustrative program modules and steps described in connection with the embodiments disclosed herein may be implemented as electronic hardware, computer software, or combinations of both. The various illustrative program modules and steps have been described generally in terms of their functionality. Whether the functionality is implemented as hardware or software depends in part upon the hardware constraints imposed on the system. Hardware and software may be interchangeable depending on such constraints. As examples, the various illustrative program modules and steps described in connection with the embodiments disclosed herein may be implemented or performed with an application specific integrated circuit (ASIC), a field programmable gate array (FPGA) or other programmable logic device, discrete gate or transistor logic, discrete hardware components, a conventional programmable software module and a processor, or any combination thereof designed to perform the functions described herein. The processor may be a microprocessor, CPU, controller, microcontroller, programmable logic device, array of logic elements, or state machine. The software module may reside in RAM memory, flash memory, ROM memory, EPROM memory, EEPROM memory, hard disk, a removable disk, a CD, DVD or any other form of storage medium known in the art. An exemplary processor may be coupled to the storage medium so as to read information from, and write information to, the storage medium. In the alternative, the storage medium may be integral to the processor.

In further embodiments, those skilled in the art will appreciate that the foregoing methods can be implemented by the execution of a program embodied on a computer readable medium. The medium may comprise, for example, RAM accessible by, or residing within the device. Whether contained in RAM, a diskette, or other secondary storage media, the program modules may be stored on a variety of machine-readable data storage media, such as a conventional "hard drive", magnetic tape, electronic read-only memory (e.g., ROM or EEPROM), flash memory, an optical storage device (e.g., CD, DVD, digital optical tape), or other suitable data storage media.

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A method of performing macro photography comprising:
    providing a macro photography system including:
        a rail assembly having a carriage adapted to receive a portion of a camera body and capable of moving forward or backward with respect to an object;
        a motor coupled to the rail assembly;
        a threaded rod removeably coupled to the motor;
        a drive nut removeably coupled to the threaded rod and removeably carried by the carriage, the drive nut and the threaded rod configured so that rotation of the threaded rod by the motor imparts linear motion on the carriage relative to the threaded rod; and
        a controller communicatively coupled to a camera and the motor, the controller programmed to provide operating instructions to the camera for activating a shutter and/or flash and to provide operating instructions to the motor for moving the carriage; receiving by the controller one or more operating parameters; transmitting instructions to the motor to move the carriage; activating a camera shutter; and collecting one or more images;
    wherein the macro photography system is selectively operable between at least one of an automatic step mode, an automatic distance mode, a total distance mode, a distance per step mode, a manual mode, and a continuous mode;
    wherein operation in the automatic step mode is defined by a number of pictures to be taken at each of a plurality of steps, operation in the automatic step mode comprising;
        prompting a user to enter a number of desired steps;
        prompting the user to move the rail assembly to a start position;
        prompting the user to select an end position;
        calculating a distance required to move per step;
        operating a camera to take a number of pictures at each of the steps;
        moving the rail assembly back to the start position;
    wherein operation in the automatic distance mode is defined by a number of pictures to be taken at each of a plurality of steps, operation in the automatic distance mode comprising;
        prompting a user to enter a distance per step;
        prompting the user to move the rail assembly to a start position;
        prompting the user to select an end position;
        calculating a number of steps required to move a distance between the start position and the end position;
        operating a camera to take a number of pictures at each of the steps;
        moving the rail assembly back to the start position;
    wherein operation in the total distance mode is defined by a number of pictures to be taken at each of a plurality of steps, operation in the total distance mode comprising;
        prompting a user to enter a number of desired steps;
        prompting the user to enter a total distance to move the rail assembly;
        calculating a distance per step required to move the total distance in the desired number of steps;
        prompting a user to select a direction of movement;
        operating a camera to take a number of pictures at each of the steps;
        moving the rail assembly back to the start position;
    wherein operation in the distance per step mode is defined by a number of pictures to be taken at each of a plurality of steps, operation in the distance per step mode comprising;
        prompting a user to enter a number of desired steps;
        prompting the user to enter a distance per step to move the rail assembly;
        prompting a user to select a direction of movement;
        operating a camera to take a number of pictures at each of the steps;
        moving the rail assembly back to the start position;
    wherein operation in the manual mode is defined by a number of pictures to be taken at each of a plurality of steps, operation in the manual mode comprising;
        prompting a user to enter a distance to move the rail assembly;
        prompting the user to select a direction of movement;
        operating a camera to take a number of pictures at each of the steps; and
    wherein operation in the continuous mode is defined by a number of pictures to be taken while a distance is travelled, operation in the continuous mode comprising;
        prompting a user to enter a distance to move the rail assembly;
        prompting the user to select a direction of movement;
        operating a camera to take a number of pictures.

2. The method of claim 1, wherein the instructions are provided to continuously move the carriage along the rail assembly.

3. The method of claim 2, wherein the movement of the carriage is accomplished at a specified speed.

4. The method of claim 1, wherein the instructions are provided to move the carriage a predetermined number of discrete intervals along the rail assembly.

5. The method of claim 4, further comprising activating the flash at least once for each interval.

6. The method of claim 5, wherein the one or more received operating parameters are selected from one or more of: the number of discrete intervals, the distance per interval, a total distance of travel of the carriage, a starting position for the carriage, an ending position for the carriage, a motor torque setting, speed of the carriage, settling time and direction of travel.

7. The method of claim 4, wherein the one or more received operating parameters are selected from one or more of: the number of discrete intervals, the distance per interval, a total distance of travel of the carriage, a starting position for the carriage, an ending position for the carriage, a motor torque setting, speed of the carriage, settling time and direction of travel.

8. The method of claim 4, further comprising calculating a distance per interval value based on said received operating parameters.

9. The method of claim 8, further comprising:
applying backlash compensation prior to moving the carriage when a previous movement of the carriage was in an opposite direction.

10. The method of claim 8, further comprising:
waiting a predetermined settling time after the rail has moved a discrete interval distance and prior to activating the camera shutter.

11. The method of claim 10, wherein the one or more operating parameters includes the predetermined settling time.

12. The method of claim 10, wherein the one or more operating parameters includes a direction of travel; and
wherein the instructions transmitted to the motor further include the selected direction of travel.

13. The method of claim 8, wherein said receiving further comprises receiving said operating parameters from a user interface control module, the operating parameters having been selected by a user interacting with a user interface.

14. The method of claim 4, further comprising calculating the number of discrete intervals based on said received operating parameters.

15. The method of claim 4, further comprising calculating a distance per interval based on said received operating parameters and calculating the number of discrete intervals based on said received operating parameters.

16. The method of claim 4, further comprising:
waiting for receipt of a notification from a user interface module prior to moving the carriage each discrete interval.

17. The method of claim 4, wherein the one or more operating parameters includes a total distance of travel of the carriage; and further comprising:
waiting for receipt of a notification from a user interface module prior to moving the carriage each discrete interval.

18. The method of claim 4, further comprising:
applying backlash compensation prior to moving the carriage when a previous movement of the carriage was in an opposite direction.

19. The method of claim 4, further comprising:
waiting a predetermined settling time after the rail has moved a discrete interval distance and prior to activating the camera shutter.

20. A method of performing macro photography comprising:
providing a macro photography system including:
a rail assembly having a carriage adapted to receive a portion of a camera body and capable of moving with respect to an object;
a motor coupled to the rail assembly;
a threaded rod removably coupled to the motor;
a drive nut removably coupled to the threaded rod and removeably carried by the carriage, the drive nut and the threaded rod configured so that rotation of the threaded rod by the motor imparts linear motion on the carriage relative to the threaded rod; and
a controller communicatively coupled to a camera and the motor, the controller programmed to provide operating instructions to the camera for activating a shutter or flash and to provide operating instructions to the motor for moving the carriage forward or backward in discrete intervals or with continuous motion;
receiving by the controller one or more operating parameters;
activating a camera shutter or flash;
determining if the carriage has traveled a predetermined total distance or a predetermined number of intervals;
transmitting instructions to the motor to move the carriage a predetermined interval distance when the carriage has not traveled at least the predetermined number of intervals or to proceed with continuous movement when the carriage has not traveled at least the predetermined total distance; and
repeating the steps of activating, determining and transmitting until the carriage has traveled at least the predetermined number of intervals or the predetermined total distance;
wherein the macro photography system is selectively operable between at least one of an automatic step mode, an automatic distance mode, a total distance mode, a distance per step mode, a manual mode, and a continuous mode;
wherein operation in the automatic step mode includes:
prompting a user for entry of a desired number of steps;
determining whether the user entered the desired number of steps;
re-prompting the user for entry of the desired number of steps if it is determined that the user did not enter the desired number of steps;
prompting the user to move the rail assembly to a start position after entry of the desired number of steps;
determining whether the user moved the rail assembly to the start position;
re-prompting the user to move the rail assembly to the start position if it is determined that the user did not move the rail assembly to the start position;
prompting the user to select an end position after the user moves the rail assembly to the start position;
determining whether the user selected the end position;
re-prompting the user to select the end position if it is determined that the user did not select the end position;
calculating a distance per step required to move each of a number of discrete intervals equal in number to the desired number of steps in a distance between the start position and the end position;
moving the rail assembly back to the start position;
performing at least one step, wherein the step is defined as:
waiting a predetermined settling time to allow a camera to become stable;
taking a predetermined number of pictures, wherein taking a picture is defined as:
activating a camera shutter for a predetermined time;
waiting a predetermined off time for the camera shutter;
maintaining a count of a number of pictures taken;
determining whether the count of the number of pictures taken is equal to the predetermined number of pictures;
incrementing the count of the number of pictures taken if the predetermined number of pictures have not been taken;
taking another picture if the predetermined number of pictures have not been taken;
maintaining a count of a number of steps moved;
determining whether the count of the number of steps moved is greater than the number of desired steps;

incrementing the count of the number of steps moved if it is determined that the number of desired steps have not been moved;

determining whether a current step is a first step moved in a given direction;

including a backlash compensation for the first step in the given direction;

moving the rail assembly the calculated distance per step;

determining whether an auto-return function is enabled if it is determined that the number of desired steps have been moved;

moving the rail assembly to the starting point if it is determined that the auto-return function is enabled;

completing the operation;

wherein operation in the automatic distance mode includes:

prompting a user for entry of a distance per step;

determining whether the user entered the distance per step;

re-prompting the user for entry of the distance per step if it is determined that the user did not enter the distance per step;

prompting the user to move the rail assembly to a start position after entry of the distance per step;

determining whether the user moved the rail assembly to the start position;

re-prompting the user to move the rail assembly to the start position if it is determined that the user did not move the rail assembly to the start position;

prompting the user to select an end position after the user moves the rail assembly to the start position;

determining whether the user selected the end position;

re-prompting the user to select the end position if it is determined that the user did not select the end position;

calculating a number of steps required to move a distance between the start position and the end position;

moving the rail assembly back to the start position;

performing at least one step, wherein the step is defined as:

waiting a predetermined settling time to allow a camera to become stable;

taking a predetermined number of pictures, wherein taking a picture is defined as:

activating a camera shutter for a predetermined time;

waiting a predetermined off time for the camera shutter;

maintaining a count of a number of pictures taken;

determining whether the count of the number of pictures taken is equal to the predetermined number of pictures;

incrementing the count of the number of pictures taken if the predetermined number of pictures have not been taken;

taking another picture if the predetermined number of pictures have not been taken;

maintaining a count of a number of steps moved;

determining whether the count of the number of steps moved is greater than the number of steps calculated;

incrementing the count of the number of steps moved if it is determined that the number of desired steps have not been moved;

determining whether a current step is a first step moved in a given direction;

including a backlash compensation for the first step in the given direction;

moving the rail assembly the calculated distance per step;

determining whether an auto-return function is enabled if it is determined that the number of desired steps have been moved;

moving the rail assembly to the starting point if it is determined that the auto-return function is enabled;

completing the operation;

wherein operation in the total distance mode includes:

prompting a user for entry of a desired number of steps;

determining whether the user entered the desired number of steps;

re-prompting the user for entry of the desired number of steps if it is determined that the user did not enter the desired number of steps;

prompting the user for entry of the total distance to move the rail assembly;

determining whether the user entered the total distance to move the rail assembly;

re-prompting the user for entry of the total distance to move the rail assembly if it is determined that the user did not enter the total distance to move the rail assembly;

calculating a distance per step required to move the total distance in the desired number of steps;

prompting the user to select a direction of movement;

determining whether the user pressed the up button;

determining whether the user pressed the down button if it is determined that the user did not press the up button;

re-prompting the user to select a direction of movement if it is determined that the user did not press the down button;

setting a distance to move the rail assembly in the negative direction if it is determined that the user pressed the down button;

determining whether a current direction of movement is identical to a last direction of movement;

applying a backlash compensation if it is determined that the current direction of movement is not identical to the last direction of movement moving at least one step, wherein the step is defined as:

waiting a predetermined settling time to allow a camera to become stable;

taking a predetermined number of pictures, wherein taking a picture is defined as:

activating a camera shutter for a predetermined time;

waiting a predetermined off time for the camera Shutter;

maintaining a count of a number of pictures taken;

determining whether the count of the number of pictures taken is equal to the predetermined number of pictures;

incrementing the count of the number of pictures taken if the predetermined number of pictures have not been taken;

taking another picture if the predetermined number of pictures have not been taken;

maintaining a count of a number of steps moved;

determining whether the count of the number of steps moved is greater than the number of desired steps;

incrementing the count of the number of steps moved if it is determined that the number of desired steps have not been moved;

moving the rail assembly the calculated distance per step;
determining whether an auto-return function is enabled if it is determined that the number of desired steps have been moved;
moving the rail assembly to the starting point if it is determined that the auto-return function is enabled;
completing the operation,
wherein operation in the distance per step mode includes:
prompting a user for entry of a desired number of steps;
determining whether the user entered the desired number of steps;
re-prompting the user for entry of the desired number of steps if it is determined that the user did not enter the desired number of steps;
prompting the user for entry of the distance per step to move the rail assembly;
determining whether the user entered the distance per step to move the rail assembly;
re-prompting the user to enter the distance per step to move the rail assembly if it is determined that the user did not enter the distance per step to move the rail assembly;
prompting the user to select a direction of movement;
determining whether the user pressed the up button;
determining whether the user pressed the down button if it is determined that the user did not press the up button;
re-prompting the user to select a direction of movement if it is determined that the user did not press the down button;
setting a distance to move the rail assembly in the negative direction if it is determined that the user pressed the down button;
determining whether a current direction of movement is identical to a last direction of movement;
applying a backlash compensation if it is determined that the current direction of movement is not identical to the last direction of movement;
moving at least one step, wherein the step is defined as:
waiting a predetermined settling time to allow a camera to become stable;
taking a predetermined number of pictures, wherein taking a picture is defined as:
activating a camera shutter for a predetermined time;
waiting a predetermined off time for the camera Shutter;
maintaining a count of a number of pictures taken;
determining whether the count of the number of pictures taken is equal to the predetermined number of pictures;
incrementing the count of the number of pictures taken if the predetermined number of pictures have not been taken;
taking another picture if the predetermined number of pictures have not been taken;
maintaining a count of a number of steps moved;
determining whether the count of the number of steps moved is greater than the number of desired steps;
incrementing the count of the number of steps moved if it is determined that the number of desired steps have not been moved;
moving the rail assembly the calculated distance per step;
determining whether an auto-return function is enabled if it is determined that the number of desired steps have been moved;
moving the rail assembly to the starting point if it is determined that the auto-return function is enabled;
completing the operation;
wherein operation in the manual mode includes:
prompting the user for entry of the distance to move the rail assembly;
determining whether the user entered the distance to move the rail assembly;
re-prompting the user for entry of the distance to move the rail assembly if it is determined that the user did not enter the distance to move the rail assembly;
prompting the user to select a direction of movement;
determining whether the user pressed the up button;
determining whether the user pressed the down button if it is determined that the user did not press the up button;
re-prompting the user to select a direction of movement if it is determined that the user did not press the down button;
setting a distance to move the rail assembly in the negative direction if it is determined that the user pressed the down button;
determining whether a current direction of movement is identical to a last direction of movement;
applying a backlash compensation if it is determined that the current direction of movement is not identical to the last direction of movement;
moving the rail assembly the determined distance;
waiting a predetermined settling time to allow a camera to become stable;
taking a predetermined number of pictures, wherein taking a picture is defined as:
activating a camera shutter for a predetermined time;
waiting a predetermined off time for the camera shutter;
maintaining a count of a number of pictures taken;
determining whether the count of the number of pictures taken is equal to the predetermined number of pictures;
incrementing the count of the number of pictures taken if the predetermined number of pictures have not been taken;
taking another picture if the predetermined number of pictures have not been taken;
completing the operation; and
wherein operation in the continuous mode includes:
prompting the user for entry of the distance to move the rail assembly;
determining whether the user entered the distance to move the rail assembly;
re-prompting the user for entry of the distance to move the rail assembly if it is determined that the user did not enter the distance to move the rail assembly;
prompting the user to select a direction of movement;
determining whether the user pressed the up button;
determining whether the user pressed the down button if it is determined that the user did not press the up button;
re-prompting the user to select a direction of movement if it is determined that the user did not press the down button;
setting a distance to move the rail assembly in the negative direction if it is determined that the user pressed the down button;

determining whether a current direction of movement is identical to a last direction of movement;

applying a backlash compensation if it is determined that the current direction of movement is not identical to the last direction of movement;

starting to move the rail assembly the determined distance;

taking a predetermined number of pictures, wherein taking a picture is defined as:

activating a camera shutter for a predetermined time;

waiting a predetermined off time for the camera shutter;

determining whether the distance to move the rail assembly has been travelled;

taking another picture if the distance to move the rail assembly has not been travelled;

completing the operation.

21. The method of claim 20, further comprising:
calculating the predetermined interval distance based on said received operating parameters.

22. The method of claim 21, wherein the one or more received operating parameters include a total number of intervals, a starting position for the carriage and an ending position for the carriage.

23. The method of claim 21, wherein the one or more received operating parameters include a total number of intervals and the total distance of travel.

24. The method of claim 23, wherein the one or more received operating parameters includes the distance per interval, a starting position for the carriage and an ending position for the carriage.

25. The method of claim 21, further comprising:
waiting a predetermined settling time after the rail has moved a discrete interval distance and prior to activating the camera shutter.

26. The method of claims 20, further comprising:
calculating the predetermined number of intervals based on said received operating parameters.

27. The method of claim 26, further comprising:
waiting a predetermined settling time after the rail has moved a discrete interval distance and prior to activating the camera shutter.

28. The method of claim 20, wherein the one or more received operating parameters include the predetermined interval distance and the total number of intervals.

29. The method of claim 20, wherein the one or more operating parameters includes the predetermined interval distance; and further comprising:
waiting for receipt of a notification from a user interface module prior to moving the carriage at each interval.

30. The method of claim 20, wherein the one or more received operating parameters are selected from one or more of: the number of discrete intervals, the distance per interval, a total distance of travel of the carriage, a starting position for the carriage, an ending position for the carriage, a motor torque setting, speed of the carriage, settling time and direction of travel.

31. The method of claim 30, further comprising:
applying backlash compensation prior to moving the carriage when a previous movement of the carriage was in an opposite direction.

32. The method of claim 31, further comprising:
waiting a predetermined settling time after the rail has moved a discrete interval distance and prior to activating the camera shutter.

33. The method of claim 20, further comprising:
waiting a predetermined settling time after the rail has moved a discrete interval distance and prior to activating the camera shutter.

34. The method of claim 20, wherein the one or more operating parameters includes a direction of travel, the direction of travel being selected from: a forward direction and backwards direction; and
wherein the instructions transmitted to the motor further include the selected direction of travel.

35. A macro photography system comprising:
a macro rail assembly having:
a carriage adapted to receive a portion of a camera body and configured to move forward or backward with respect to an external object and for mounting a camera thereon;
a motor coupled to the moveable carriage;
a threaded rod removably coupled to the motor;
a drive nut removably coupled to the threaded rod and removeably carried by the carriage; and
wherein rotation of the threaded rod by the motor imparts linear motion on the carriage relative to the threaded rod;
a controller assembly electrically coupled to the motor and communicatively coupled to the camera, the controller assembly having:
a controller module programmed to provide operating instructions to the camera for activating a shutter or flash and to provide operating instructions to the motor for moving the carriage forward or backward in discrete intervals or with continuous motion;
a user interface module for receiving operating parameters from a user, the user interface module communicatively coupled to the controller module;
wherein the macro rail assembly is selectively operable between at least one of an automatic step mode, an automatic distance mode, a total distance mode, a distance per step mode, a manual mode, and a continuous mode;
wherein operation in the automatic step mode is defined by a number of pictures to be taken at each of a plurality of steps, operation in the automatic step mode comprising:
prompting a user to enter a number of desired steps;
prompting the user to move the rail assembly to a start position;
prompting the user to select an end position;
calculating a distance required to move per step;
operating a camera to take a number of pictures at each of the steps;
moving the rail assembly back to the start position;
wherein operation in the automatic distance mode is defined by a number of pictures to be taken at each of a plurality of steps, operation in the automatic distance mode comprising;
prompting a user to enter a distance per step;
prompting the user to move the rail assembly to a start position;
prompting the user to select an end position;
calculating a number of steps required to move a distance between the start position and the end position;
operating a camera to take a number of pictures at each of the steps;
moving the rail assembly back to the start position;

wherein operation in the total distance mode is defined by a number of pictures to be taken at each of a plurality of steps, operation in the total distance mode comprising;
prompting a user to enter a number of desired steps;
prompting the user to enter a total distance to move the rail assembly;
calculating a distance per step required to move the total distance in the desired number of steps;
prompting a user to select a direction of movement;
operating a camera to take a number of pictures at each of the steps;
moving the rail assembly back to the start position;
wherein operation in the distance per step mode is defined by a number of pictures to be taken at each of a plurality of steps, operation in the distance per step mode comprising;
prompting a user to enter a number of desired steps;
prompting the user to enter a distance per step to move the rail assembly;
prompting a user to select a direction of movement;
operating a camera to take a number of pictures at each of the steps;
moving the rail assembly back to the start position;
wherein operation in the manual mode is defined by a number of pictures to be taken at each of a plurality of steps, operation in the manual mode comprising;
prompting a user to enter a distance to move the rail assembly;
prompting the user to select a direction of movement;
operating a camera to take a number of pictures at each of the steps; and
wherein operation in the continuous mode is defined by a number of pictures to be taken while a distance is travelled, operation in the continuous mode comprising;
prompting a user to enter a distance to move the rail assembly;
prompting the user to select a direction of movement;
operating a camera to take a number of pictures.

36. The system of claim 35, wherein the motor is a stepper motor.

37. The system of claim 35, wherein the controller module is further programmed to wait a predetermined settling time after the rail has moved a discrete interval and prior to activating the camera shutter.

38. The system of claim 37, wherein the controller module is further programmed to apply backlash compensation prior to moving the carriage when a previous movement of the carriage was in an opposite direction.

* * * * *